US009108496B2

(12) United States Patent
Yamamoto et al.

(10) Patent No.: US 9,108,496 B2
(45) Date of Patent: Aug. 18, 2015

(54) IN-WHEEL MOTOR DRIVE ASSEMBLY

(71) Applicant: NTN CORPORATION, Osaka (JP)

(72) Inventors: Tetsuya Yamamoto, Iwata (JP); Akira Yamagata, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/220,380

(22) Filed: Mar. 20, 2014

(65) Prior Publication Data

US 2014/0203622 A1    Jul. 24, 2014

Related U.S. Application Data

(63) Continuation of application No. 13/505,914, filed as application No. PCT/JP2010/068050 on Oct. 14, 2010, now Pat. No. 8,800,702.

(30) Foreign Application Priority Data

Nov. 13, 2009  (JP) .................. 2009-260012
Feb. 9, 2010   (JP) .................. 2010-026398

(51) Int. Cl.
*B60K 7/00*    (2006.01)
*B60G 3/20*    (2006.01)
*B60K 17/04*   (2006.01)
*F16H 1/32*    (2006.01)

(52) U.S. Cl.
CPC ............... *B60K 7/0007* (2013.01); *B60G 3/20* (2013.01); *B60K 17/043* (2013.01); *B60G 2204/148* (2013.01); *B60G 2204/30* (2013.01); *B60G 2300/50* (2013.01); *B60K 17/046* (2013.01); *B60K 2007/0038* (2013.01); *B60K 2007/0092* (2013.01); *F16H 1/32* (2013.01)

(58) Field of Classification Search
USPC .............. 180/65.51, 65.6, 65.7; 301/6.5
See application file for complete search history.

(56) References Cited

U.S. PATENT DOCUMENTS

| 5,087,229 | A  | * | 2/1992  | Hewko et al. ............. 475/149 |
| 7,121,367 | B2 |   | 10/2006 | Ajiro et al. |
| 7,527,113 | B2 | * | 5/2009  | Jenkins .................... 180/65.51 |
| 8,393,424 | B2 |   | 3/2013  | Makino et al. |
| 2005/0236198 | A1 | | 10/2005 | Jenkins |
| 2006/0144626 | A1 | | 7/2006  | Mizutani et al. |
| 2007/0209852 | A1 | | 9/2007  | Kamiya |

(Continued)

FOREIGN PATENT DOCUMENTS

JP    09-301002      11/1997
JP    2005-119548    5/2005

(Continued)

*Primary Examiner* — John Walters
*Assistant Examiner* — Brian Swenson
(74) *Attorney, Agent, or Firm* — Clark & Brody

(57) ABSTRACT

An in-wheel motor drive assembly 21 includes: a motor unit A; a speed reduction unit B having an output shaft 28 reducing the rotational speed of the motor rotary shaft 35 and outputting the reduced rotation and a speed-reduction-unit casing 22b forming a contour, and disposed on one axial side of the motor unit A; a wheel hub bearing unit C having a wheel hub 32 fixedly coupled with the output shaft 28 and a wheel-hub-bearing outer ring 22c rotatably supporting the wheel hub 32, and disposed on one axial side of the speed reduction unit B; and coupling portions 63, 64 secured to at least one of the wheel-hub-bearing outer ring 22c and speed-reduction-unit casing 22b to couple with members of a vehicle body.

10 Claims, 14 Drawing Sheets

(56) References Cited

U.S. PATENT DOCUMENTS

| | | | |
|---|---|---|---|
| 2009/0000840 A1 | 1/2009 | Murata | |
| 2009/0101424 A1 | 4/2009 | Suzuki | |
| 2009/0236157 A1 | 9/2009 | Akamatsu | |
| 2010/0000811 A1* | 1/2010 | Iwano | 180/65.51 |

FOREIGN PATENT DOCUMENTS

| | | |
|---|---|---|
| JP | 2005-329757 | 12/2005 |
| JP | 2006-188153 | 7/2006 |
| JP | 2007-196697 | 8/2007 |
| JP | 2007-210491 | 8/2007 |
| JP | 2007-223381 | 9/2007 |
| JP | 2008-044537 | 2/2008 |
| JP | 2008-081091 | 4/2008 |
| JP | 2008-141864 | 6/2008 |
| JP | 2008-168801 | 7/2008 |
| JP | 2008-168802 | 7/2008 |
| JP | 2008-168873 | 7/2008 |
| JP | 2008-189062 | 8/2008 |
| JP | 2008-201353 | 9/2008 |
| JP | 2009-262616 | 11/2009 |
| WO | 2005/000621 | 1/2005 |
| WO | 2007/043514 | 4/2007 |

* cited by examiner

IN-WHEEL MOTOR DRIVE ASSEMBLY

This application is a Continuation of U.S. Ser. No. 13/505,914 filed on May 3, 2012, which is a national phase of PCT/JP2010/068050 filed on Oct. 14, 2010, which is published as WO2011/058844 on May 19, 2011.

TECHNICAL FIELD

The present invention relates to an in-wheel motor drive assembly for driving wheels, and more particularly to the structure for attaching the in-wheel motor drive assembly to suspension parts, such as a trailing arm, a lower arm and a shock absorber.

BACKGROUND ART

In recent automotive technology, attention is being given to in-wheel motor drives, each of which is partially or entirely mounted in an interior space of a road wheel to drive the wheel. A conventional in-wheel motor drive is disclosed in, for example, Japanese Unexamined Patent Application Publication No. 2008-44537 (PTL 1). The in-wheel motor drive in PTL 1 includes a drive motor, a speed reducer that receives a driving force from the drive motor, reduces the rotational speed and outputs it to a wheel, and a wheel hub member that is connected with an output shaft of the speed reducer, the drive motor, speed reducer and hub member being coaxially arranged in a line. This reducer adopts a cycloid reduction mechanism that provides a higher reduction ratio than that of conventional planetary gear speed reduction mechanisms known as general speed reducers. Thanks to the cycloid reduction mechanism, the torque required by the drive motor can be set smaller and the in-wheel motor drive can be reduced in size and weight.

CITATION LIST

Patent Literature

PTL 1: Japanese Unexamined Patent Application Publication No. 2008-44537

SUMMARY OF INVENTION

Technical Problem

Because wheels have to be mounted to a vehicle body, the in-wheel motor drive connected with a wheel is connected to members of the vehicle body. Specifically, the wheel is suspended from the vehicle body with a suspension system by connecting the in-wheel motor drive connected with the wheel to the suspension members of the suspension system. In this manner, the wheel is suspended from the vehicle body. The wheel suspension systems are roughly grouped into a torsion beam suspension system, semi-trailing arm suspension system, full-trailing arm suspension system, strut suspension system, and double wishbone suspension system. According to the chosen suspension system, the in-wheel motor drive is connected to one of the suspension members: a torsion beam, trailing arm, lower arm, upper arm, or a shock absorber.

The suspension members move up and down due to wheel loads caused by the vehicle's weight, disturbance of the road on which the vehicle travels, moment loads in cornering, and other factors. The up-and-down movements may deform both the suspension members and in-wheel motor drive, and the deformation may have an adverse effect on components in the in-wheel motor drive.

A detailed description will be given with a trailing arm as an example. To achieve driving stability of a vehicle equipped with an in-wheel motor drive, a base end of a trailing arm is coupled with a vehicle body, while a free end of the trailing arm is coupled with an in-wheel motor drive provided in each wheel. More specifically, the free end of the trailing arm is coupled with a portion of the in-wheel motor drive that projects out of an interior space of the road wheel and a portion of the in-wheel motor drive that is in the interior space and in proximity of an opening of the interior space. Thus, it is common for a drive motor part and a cycloid reducer part of the in-wheel motor drive to be attached to a rear end of the trailing arm extending in the longitudinal direction of the vehicle so as to support the whole in-wheel motor drive.

However, the aforementioned attachment structure brings about deformation of the trailing arm and the whole in-wheel motor drive coupled thereto due to wheel loads applied from the wheel to the hub members. The deformation causes deformation of the reducer and drive motor inside the drive. The drive motor includes a rotor, which is supported at its opposite axial ends by bearings provided at both end faces of a motor casing and rotates at high speed, and a stator, which is secured near the casing. Since the rotor and stator face each other with a slight radial gap therebetween, the drive motor with such a rotor and stator is likely to suffer from deformation of the in-wheel motor drive, which may cause a problem that the rotor abuts on the stator. If the speed reducer is deformed, gears making up the speed reducer will have problems in meshing. One possible solution for the problems is to enhance the rigidity of the casing by making it with steel, making it thicker and other methods.

For additional improvement of driving stability, there are demands to reduce the weight of a lower structure, including the in-wheel motor drive, disposed on the side of the road with respect to the suspension. Thinning the casing is a possible means for reducing the weight of the in-wheel motor drive; however, the aforementioned problem may be an obstruction for the means.

In view of these circumstances and to address the requests to make the casing thinner and make the in-wheel motor drive lighter, the present invention has an object to provide an in-wheel motor drive with a drive motor that will not become deformed even if the in-wheel motor drive is coupled to vehicle body parts, such as suspension members.

Solution to Problem

To achieve the object, the in-wheel motor drive assembly according to the present invention includes: a motor unit with a motor rotary shaft and a motor-unit casing forming the contour of the motor unit; a speed reduction unit with an output shaft reducing the rotational speed of the motor rotary shaft and outputting the reduced rotation and a speed-reduction-unit casing forming the contour of the speed reduction unit, the speed reduction unit being disposed on one axial side of the motor unit; a wheel hub bearing unit with a wheel hub fixedly coupled with the output shaft and a wheel-hub-bearing outer ring rotatably supporting the wheel hub, the wheel hub bearing unit being disposed on one axial side of the speed reduction unit; and a coupling portion secured to at least one of the wheel-hub-bearing outer ring and the speed-reduction-unit casing to couple with a member of a vehicle body.

Since the in-wheel motor drive assembly according to the present invention is provided with the coupling portion secured to at least one of the wheel-hub-bearing outer ring and speed-reduction-unit casing and coupled with a member of the vehicle body, the wheel load is transmitted through the wheel hub bearing, speed reduction unit and coupling portion, but not the motor unit. Therefore, the motor unit does not receive the wheel loads and does not suffer deformation, thereby preventing the rotor and stator inside the motor from coming into contact.

The coupling portion can be fixed to at least one of the wheel-hub-bearing outer ring and speed-reduction-unit casing, that is, the coupling portion may be fixed to only the wheel hub bearing or only the speed reduction unit. Alternatively, the coupling portion may be fixed across the wheel hub bearing and speed reduction unit. In addition, the coupling portion may be provided between the wheel hub bearing and speed reduction unit. Alternatively, the coupling portion may be provided between the motor unit and speed reduction unit. Furthermore, the coupling portion may be an independent component of the motor-unit casing and speed-reduction-unit casing and coupled therewith with bolts or the like so as not to move relative to the casings. Alternatively, the coupling portion may be integrally formed with the casing by welding or casting.

The coupling portion is secured to a part of at least one of the wheel-hub-bearing outer ring and speed-reduction-unit casing; however, the shape of the part to be secured to the coupling portion is not specifically limited, it may extend like an arm, or it may expand circumferentially toward the outer radius, like a fan or a flange. In one embodiment, the in-wheel motor drive assembly further includes a flange portion disposed between the motor unit and speed reduction unit and radially expanding, and a coupling portion provided to the flange portion.

The flange portion described herein can be a component expanding perpendicular to the axis, such as an inward flange and outward flange. When the motor unit and speed reduction unit having different outer diameters are connected, the flange portion of an example is recognized as an inward flange as viewed from the relatively large diameter unit, while the flange portion is recognized as an outward flange as viewed from the relatively small diameter unit. In addition to this, it should be understood that the flange portion may be an outward flange radially extending outward of both the motor unit and speed reduction unit.

If a member of the vehicle body is a deformable trailing arm, increasing the rigidity of the flange portion of the present invention can prevent the in-wheel motor drive assembly from being deformed by the deformed trailing arm. Thus, the present invention can make the in-wheel motor drive assembly thinner and lighter.

The coupling portion of the present invention may be a pivotable ball joint or a tightly fixed seat portion and can be anything as long as the coupling portion can couple with a member attached with the vehicle body. The coupling portion of the present invention is coupled with the suspension member attached to the vehicle body to suspend the wheel and in-wheel motor drive assembly. Thanks to the configuration, even if external force from the road surface and shock generated during acceleration and deceleration are transferred to the in-wheel motor drive assembly, the motor unit will not become deformed. The structure of the motor unit is not specifically limited and can be a radial gap motor or an axial gap motor. The structure of the speed reduction unit is not specifically limited and can adopt a planetary gear mechanism or a cycloid reduction mechanism.

The flange portion of the present invention can be any type of flange as long as it can be arranged between the motor unit and speed reduction unit. The flange portion is preferably secured to both the motor-unit casing and speed-reduction-unit casing. According to the embodiment, the wheel load can be appropriately supported with the casing of the in-wheel motor drive assembly.

The vehicle body member of the present invention is generally assumed to be a suspension member of a suspension system. The coupling portion can be coupled with any suspension members and disposed frontward with respect to the axis or rearward with respect to the axis, or disposed above the axis or below the axis. For example, when a suspension member is a trailing arm extending in the longitudinal direction of the vehicle, an embodiment applicable thereto includes a front coupling portion that is disposed frontward with respect to the axis and projects downwardly and a rear coupling portion that is disposed rearward with respect to the axis and projects downwardly. According to the embodiment, the coupling portions, which are disposed on the front side and rear side of the axis, respectively, and project downwardly, allow the trailing arm to support the in-wheel motor drive assembly from below. Thus, the present invention is applicable to the suspension system with the trailing arm.

Alternatively, in an embodiment where the coupling portion is coupled with a strut type suspension system having a strut and a lower arm as suspension members, the coupling portion includes an upper coupling portion disposed above the axis and a lower coupling portion disposed below the axis. According to the embodiment, the present invention is applicable to the strut type suspension system by coupling the upper coupling portion to a lower end of the strut and coupling the lower coupling portion to a free end of the lower arm. Also according to the embodiment, the present invention is applicable to the double wishbone type suspension system by coupling the upper coupling portion to a free end of the upper arm and coupling the lower coupling portion to a free end of the lower arm.

The flange portion of the present invention carries the wheel loads; however, the motor unit may carry a part of the wheel load to the extent in which deformation does not appear on the motor unit. For example, the motor unit further includes a motor-side coupling portion to be coupled with a suspension system of the vehicle body at an end portion of the motor that is positioned axially opposite to the speed reduction unit. The embodiment provides more freedom of choice of suspension systems and permits various types of suspension systems to suspend the in-wheel motor drive assembly.

Specifically, the coupling portion is disposed below the axis, and the motor unit further includes a motor-side coupling portion for coupling with a member of the vehicle body at an upper area of an end of the motor that is positioned axially opposite to the speed reduction unit. Alternatively, the coupling portion is disposed above the axis, and the motor unit further includes a motor-side coupling portion for coupling with a member of the vehicle body at a lower area of an end of the motor that is positioned axially opposite to the speed reduction unit.

Preferably, the flange portion has a caliper coupling portion used to fixedly attach a brake caliper. The embodiment permits the brake caliper to be fixedly attached to the flange portion, thereby facilitating the arrangement of the brake caliper.

In another embodiment of a member to which the coupling portion is secured on at least one of the wheel-hub-bearing outer ring and speed-reduction-unit casing, the in-wheel motor drive assembly further includes a coupling member whose root end part is secured to at least one of the wheel-hub-bearing outer ring and speed-reduction-unit casing and whose tip end part projects radially outward, the coupling portion being coupled with the tip end region of the coupling member.

According to the embodiment, the coupling member having the coupling portion at the tip end region is secured to at least one of the wheel-hub-bearing outer ring and speed-reduction-unit casing, and therefore wheel loads are transferred to the wheel hub, wheel-hub-bearing outer ring and coupling member, but not to the motor unit. The motor unit that does not receive the wheel loads does not suffer from deformation, thereby preventing the rotor and stator from making contact with each other in the motor. It should be understood that the coupling member, described herein, secured to at least one of the wheel-hub-bearing outer ring and speed-reduction-unit casing may be secured to the wheel-hub-bearing outer ring, may be fixedly interposed between the wheel-hub-bearing outer ring and speed-reduction-unit casing, may be secured to speed-reduction-unit casing, or may be fixedly interposed between the speed-reduction-unit casing and motor-unit casing.

In addition, since the coupling member according to the embodiment is secured to the wheel-hub-bearing outer ring or fixedly interposed between the wheel-hub-bearing outer ring and speed-reduction-unit casing, wheel loads are transferred neither to the motor unit nor speed reduction unit. The speed reduction unit that does not receive the wheel loads does not suffer from deformation, thereby preventing gear mesh variations in the speed reduction unit.

This embodiment is applicable to any type of vehicle body member as long as the member can be attached to a vehicle body. According to the embodiment, coupling with the suspension member attached to the vehicle body to suspend the wheel and in-wheel motor drive assembly prevents deformation of the motor unit and speed reduction unit, even if external force from the road surface and shock generated during acceleration and deceleration are transmitted to the in-wheel motor drive assembly. The structure of the motor unit is not specifically limited and can be a radial gap motor or an axial gap motor. The structure of the motor unit is not specifically limited and can be a radial gap motor or an axial gap motor. The structure of the speed reduction unit is not specifically limited and can adopt a planetary gear mechanism or a cycloid reduction mechanism.

The present invention is applicable to various types of suspension members, such as a strut type suspension system having a strut and a lower arm as suspension members. The coupling member according to the embodiment includes an upper coupling member disposed above the axis and a lower coupling member disposed below the axis. According to the embodiment, a coupling portion of the upper coupling member is coupled with a lower end of the strut and a coupling portion of the lower coupling member is coupled with a free end of the lower arm. Thus, the present invention can be applied to the strut type suspension system.

Another embodiment of the present invention is applicable to, for example, a double wishbone type suspension system including an upper arm, a lower arm, and a shock absorber as suspension members. In the embodiment, the speed-reduction-unit casing has a coupling portion for coupling with a member of the vehicle body on its outer circumferential surface. According to the embodiment, a coupling portion of the upper coupling member is coupled with a free end of the upper arm, a coupling portion of the lower coupling member is coupled with a free end of the lower arm, and the coupling portion of the speed-reduction-unit casing is coupled with the shock absorber. Thus, the present invention can be applied to the double wishbone type suspension system.

Yet another embodiment of the present invention is applicable to, for example, a trailing arm type suspension system having a trailing arm and a shock absorber as suspension members. In the embodiment, the coupling member includes a lower coupling member disposed below the axis, and the speed-reduction-unit casing has a coupling portion for coupling with a member of the vehicle body on its outer circumferential surface. According to the embodiment, a coupling portion of the lower coupling member is coupled with a free end of the trailing arm and the coupling portion of the speed-reduction-unit casing is coupled with the shock absorber. Thus, the present invention can be applied to the trailing arm type suspension system. Even if the trailing arm is deformed, the deformation affects only the lower coupling member of the in-wheel motor drive assembly, but not the motor unit and speed reduction unit.

The present invention is not limited to one embodiment. For example, one of a wheel-hub-bearing outer ring and speed-reduction-unit casing has a casing projecting portion projecting to the other, and the other engages with the casing projecting portion. A coupling member is fixedly interposed between the wheel-hub-bearing outer ring and speed-reduction-unit casing on a radially outside of the casing projecting portion. According to the embodiment, the wheel-hub-bearing outer ring and speed-reduction-unit casing engaged with each other can enhance the rigidity of the in-wheel motor drive assembly.

Preferably, in the root end part of the coupling member, a boundary between a radially inner surface in contact with the casing projecting portion and a surface in axial contact with the wheel-hub-bearing outer ring is chamfered. According to the embodiment, the chamfered part formed between the radially inner surface and the surface in contact with the wheel-hub-bearing outer ring can relief the stress caused by wheel loads to prevent stress concentration on the root end part of the coupling member.

The present invention is not limited to one embodiment. For example, one of the wheel-hub-bearing outer ring and speed-reduction-unit casing includes a cut-away portion on an end thereof facing the other, extending radially inward from an outer circumferential surface thereof, and the coupling member has a root end part fitting in the cut-away portion. According to the embodiment, a cut-away portion, which extends from the outer circumferential surface to the inner circumferential surface of the wheel-hub-bearing outer ring to fit with the root end part of the coupling member can enhance the rigidity of the connection between the wheel-hub-bearing outer ring and coupling member. In addition, a cut-away portion formed in the speed-reduction-unit casing can also enhance the rigidity of the connection between the speed-reduction-unit casing and coupling member. The wheel-hub-bearing outer ring can be directly connected to the speed-reduction-unit casing or connected with a coupling member disposed therebetween.

The present invention is not limited to one embodiment. For example, the root end part of the coupling member has a through bore through which the output shaft or input shaft passes. According to the embodiment, the root end part with the through bore can be shaped into a ring. Since the output shaft or input shaft passes through the root end part, the whole circumference of the ring-like root end part can be connected to adjacent casing. Thus, the rigidity of the connection between the casing and coupling member can be enhanced. When the coupling member is disposed between the wheel-hub-bearing outer ring and speed-reduction-unit casing, the wheel-hub-bearing outer ring and speed-reduction-unit casing can be directly connected with each other or connected with the coupling member disposed therebetween. In addition, when the coupling member is disposed between the speed-reduction-unit casing and motor-unit casing, the speed-reduction-unit casing and motor-unit casing can be directly connected with each other or connected with the coupling member disposed therebetween.

Preferably, the root end part of the coupling member is interposed between the wheel-hub-bearing outer ring and speed-reduction-unit casing to separate the wheel-hub-bearing outer ring and speed-reduction-unit casing from each other. Since the speed-reduction-unit casing is separated from the wheel hub casing according to the embodiment, wheel loads are transferred to the wheel-hub-bearing outer ring and coupling member, but not at all to the speed-reduction-unit casing. Thus, the wheel loads are not transferred to the motor unit and speed reduction unit, thereby appropriately preventing deformation of the motor unit and speed reduction unit.

Preferably, the output shaft has at least one hollow space in an axial direction. According to the embodiment, the output shaft can be reduced in weight, which compensates for the weight increase caused by addition of the arm-like coupling member to the in-wheel motor drive assembly.

Preferably, the coupling member is interposed between the wheel-hub-bearing outer ring and speed-reduction-unit casing so that wheel-hub-bearing outer ring makes surface contact with the coupling member. The surface contact is made between flat faces orthogonal to the axis, and the each flat face includes a radially outer flat face, a radially inner flat face and a step therebetween to form two stairs. According to the embodiment, the contact surfaces includes the flat faces functioning as a rabbet joint that can secure the connection between the wheel-hub-bearing outer ring and coupling member. In assembly operation of the in-wheel motor drive assembly, the rabbet joint facilitates positioning the coupling member in place, thereby increasing assembling efficiency.

Preferably, the coupling member includes a seat portion in the middle area between the root end part and tip end part to attach the brake caliper. According to the embodiment, the seat portion allows the brake caliper to be fixedly coupled with the coupling member to thereby facilitate the arrangement of the brake caliper.

Preferably, the speed reduction unit adopts a cycloid speed reduction mechanism that reduces the rotational speed of the input shaft and transmits the reduced rotation to the output shaft, and includes: the input shaft fixedly coupled to the motor rotary shaft; a disc-like eccentric member connected to an end of the input shaft so as to be eccentric from a rotational axis of the input shaft; a revolution member whose inner circumferential surface is attached to the outer circumferential surface of the eccentric member so as to rotate relative to the eccentric member, the revolution member making orbital motion around the rotational axis with rotation of the input shaft; a perimeter engagement member engaging with the outer perimeter of the revolution member to allow the revolution member to make axial rotation; and a motion conversion mechanism extracting only the axial rotation of the revolution member to transmit the axial rotation to the output shaft. The embodiment adopting the cycloid reduction mechanism can provide a significantly high speed reduction ratio.

The motion conversion mechanism is not limited to one embodiment. For example, the motion conversion mechanism includes a plurality of holes equidistantly formed in the revolution member in a circumferential direction centered on the rotational axis; and a plurality of inner engagement members equidistantly provided on an end of the output shaft in the circumferential direction centered on the axis of the output shaft and fitting in the holes, respectively.

In another embodiment, the motion conversion mechanism includes a plurality of holes equidistantly formed in an end of the output shaft in the circumferential direction about the axis of the output shaft; and a plurality of inner engagement members equidistantly provided on the revolution member in the circumferential direction centered on the rotational axis and fitting in the holes, respectively.

Advantageous Effects of Invention

As described above, the present invention includes the coupling portion whose root end part is secured to the wheel-hub-bearing outer ring to couple with a member of the vehicle body. The coupling portion inhibits wheel loads to be transferred to the motor unit and speed reduction unit and therefore appropriately prevent deformation of the motor unit and speed reduction unit. In addition, for example, the use of thin material for the motor-unit casing and speed-reduction-unit casing can make the motor unit and speed reduction unit lighter.

Alternatively, the present invention includes the coupling portion whose root end part is secured to the speed-reduction-unit casing to couple with a member of the vehicle body. The coupling portion inhibits wheel load to be transferred to the motor unit and therefore appropriately prevents deformation of the motor unit. In addition, for example, the use of a thin material for the motor-unit casing can make the motor unit lighter. As a result, a reduction in the unsprung weight of the suspension system and an improvement in the riding comfort of the vehicle can be achieved.

DESCRIPTION OF EMBODIMENT

Figure 1:
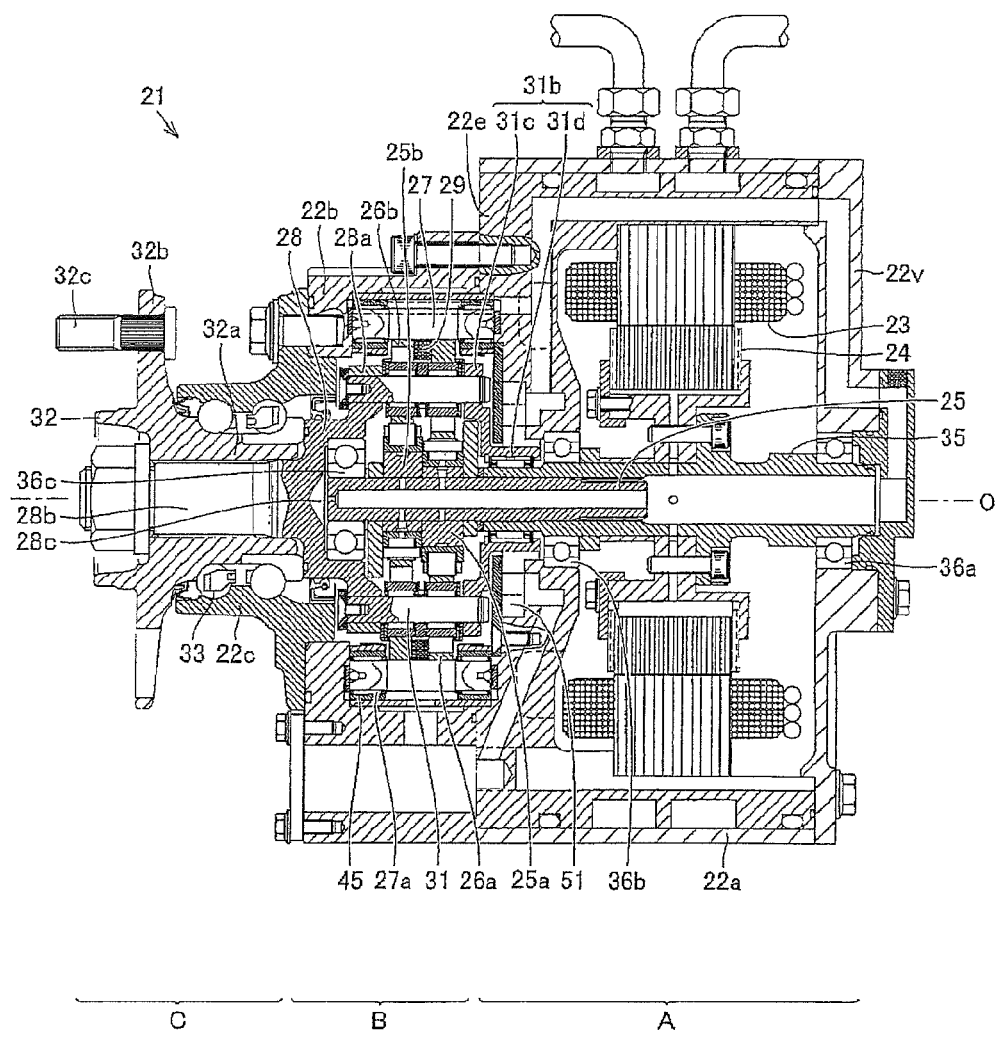
FIG. 1 is a vertical cross-sectional view of an in-wheel motor drive assembly according to the first example of the present invention.
Figure 2:
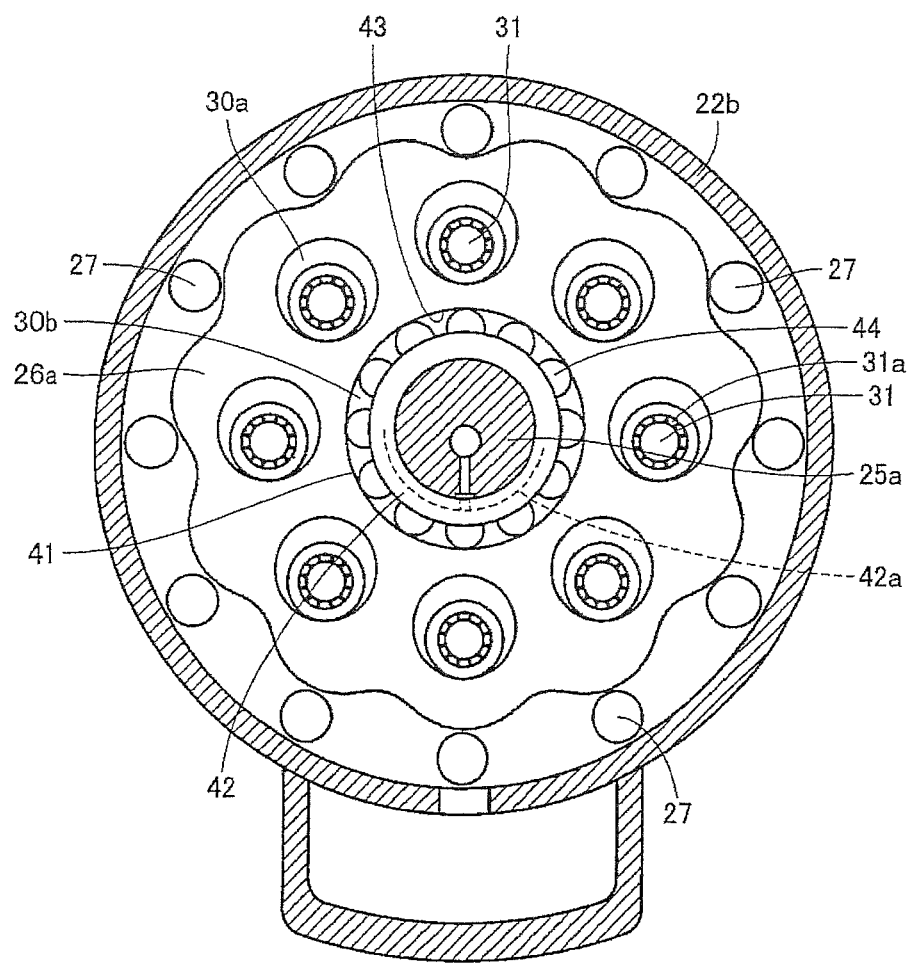
FIG. 2 is a transverse cross-sectional view of a speed reduction unit of the first example.
Figure 3:
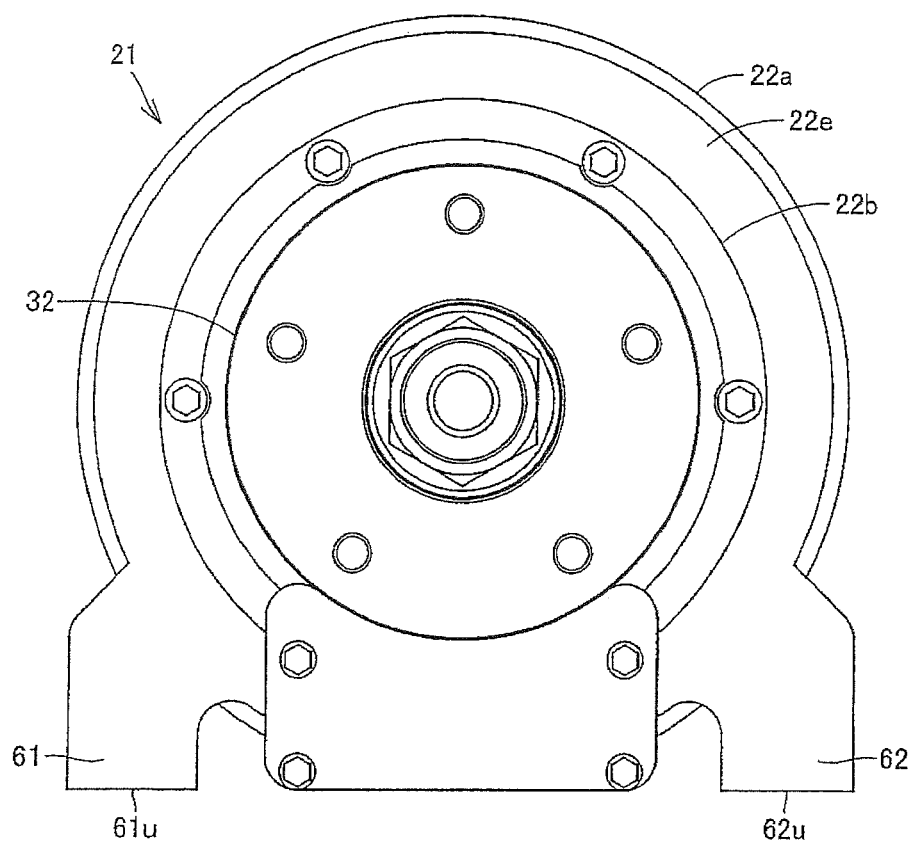
FIG. 3 is a front view of the first example.

An embodiment of the present invention will be described in detail below by referring to examples shown in the drawings. FIG. 1 is a vertical cross-sectional view of an in-wheel motor drive assembly according to the first example of the present invention. FIG. 2 is a transverse cross-sectional view of a speed reduction unit of the first example. FIG. 3 is a front view of the in-wheel motor drive assembly of the first example viewed from one side along an axial direction.

An in-wheel motor drive assembly 21, which is disposed in an interior space of a road wheel and drives the wheel, includes a motor unit A that generates driving force, a speed reduction unit B that reduces the rotational speed of the motor unit A and outputs the reduced rotation, and a wheel hub bearing unit C that transmits the output from the speed reduction unit B to the wheel (not shown). The motor unit A, speed reduction unit B and wheel hub bearing unit C are coaxially aligned in this order in a line. The in-wheel motor drive assembly 21 is mounted in a wheel housing of, for example, an electric vehicle or hybrid drive vehicle.

The motor unit A is a radial gap motor including a motor-unit casing 22a that forms a contour of the motor unit A, a stator 23 that is secured to the motor-unit casing 22a, a rotor 24 that is arranged so as to face the inner side of the stator 23 with a radial gap therebetween, and a motor rotary shaft 35 that is fixedly coupled with the inner side of the rotor 24 to rotate together with the rotor 24.

The motor-unit casing 22a is in a cylindrical shape and has an end along an axis O (left side in FIG. 1) connected with an end of a speed-reduction-unit casing 22b. The stator 23 is supported by the inner circumferential surface of the motor-unit casing 22a. On the end of the motor-unit casing 22a along the axis O, a flange portion 22e is formed so as to extend radially inward.

In the first example, the flange portion 22e is integrally connected with the axial end of the motor-unit casing 22a and is screwed to the end of the speed-reduction-unit casing 22b with bolts. Incidentally, the flange portion 22e can be an independent component separate from the motor-unit casing 22a and screwed to the motor-unit casing 22a and speed-reduction-unit casing 22b with bolts or the like. Alternatively, the flange portion 22e may be integrally connected with the axial end of the speed-reduction-unit casing 22b and screwed to the end of the motor-unit casing 22a with bolts.

The radially extending flange portion 22e is interposed between the motor-unit casing 22a and speed-reduction-unit casing 22b to connect the relatively large-diameter motor-unit casing 22a and the relatively small-diameter speed-reduction-unit casing 22b. The inner circumferential surface of the inward flange portion 22e rotatably supports one end of the motor rotary shaft 35 with a rolling bearing 36b. A disc-like motor cover 22v is secured to the other end of the motor-unit casing 22a along the axis O. The center part of the motor cover 22v rotatably supports the other end of the motor rotary shaft 35 with a rolling bearing 36a.

The speed reduction unit B includes a speed-reduction-unit casing 22b that forms a contour of the speed reduction unit B and an output shaft 28 that reduces the rotational speed of the motor rotary shaft 35 and outputs it, and is disposed on one side of the motor unit A along the axis O. Specifically, the speed reduction unit B adopts a cycloid reduction mechanism. The speed reduction unit B has an input shaft 25 extending along the axis O so as to project toward the motor unit A, and the projecting end is fixedly coupled with an axial end of the motor rotary shaft 35. The motor rotary shaft 35 of the motor unit A and the input shaft 25 of the speed reduction unit B that rotate together are collectively referred to as a motor-side rotating member. The other end of the input shaft 25 that is remote from the motor unit A is supported by a rolling bearing 36c in the speed reduction unit B.

Two disc-like eccentric members 25a, 25b are fixed to the outer circumferential surface of the input shaft 25. The motor rotary shaft 35 and input shaft 25 are aligned with the rotational axis O of the in-wheel motor drive assembly 21, but the centers of the eccentric members 25a, 25b are not aligned with the axis O. In addition, the two eccentric members 25a, 25b are provided such that their phases are shifted by 180° in order to counterbalance the centrifugal forces generated by eccentric motion thereof.

Curved plates 26a, 26b, serving as revolution members, are rotatably held on the outer circumferential surface of the eccentric members 25a, 25b, respectively. The outer perimeter of the curved plates 26a, 26b are curved in the shape of waves and engages with a plurality of outer pins 27 serving as outer engagement members. The outer pins 27 are attached along the inner circumferential surface of the speed-reduction-unit casing 22b. A center collar 29 is provided in an interstice between the curved plates 26a and 26b to prevent the curved plates 26a, 26b from tilting.

The speed-reduction-unit casing 22b is in the shape of a cylinder having a diameter smaller than that of the motor-unit casing 22a and has one end along the axis O (right side of FIG. 1) connected with an end of the motor-unit casing 22a and the other end along the axis O (left side in FIG. 1) connected with an end of a wheel-hub-bearing outer ring 22c. These casings 22a, 22b and outer ring 22c make up a single casing 22. The casing 22 rotatably supports rotating elements housed therein with various bearings including the aforementioned rolling bearing 36a and a wheel hub bearing 33 which will be described later. Therefore, the inner circumferential surface of the speed-reduction-unit casing 22b is separated from the rotating elements, such as the curved plates 26a, 26b described below, and does not make contact with the rotating elements.

The output shaft 28 of the speed reduction unit B is in alignment with the rotational axis O and extends in one direction of the axis O from the speed reduction unit B to the wheel hub bearing unit C, and includes a flange portion 28a and a shaft portion 28b. The flange portion 28a disposed in the speed reduction unit B has an end face with holes equidistantly formed along the circumference centered on the rotational axis O of the output shaft 28. The holes receive inner pins 31 to fix them. A wheel hub 32 is fixedly coupled to the outer circumferential surface of the shaft portion 28b disposed in the wheel hub bearing unit C. The output shaft 28 of the speed reduction unit B and the wheel hub 32 of the wheel hub bearing unit C that rotate together are also collectively referred to as wheel-side rotating members. The inner pins 31 implanted in the flange portion 28a project in the other direction of the axis O and engage at their tip ends with radially center regions of the curved plates 26a, 26b. The flange portion 28a has a center bore 28c that receives one end of the input shaft 25 and rotatably supports the end of the input shaft 25 with the rolling bearing 36c so that the flange portion 28a rotates with respect to the input shaft 25.

Referring to FIG. 2, the curved plate 26a has a plurality of waveforms in the form of trochoid curves, such as epitrochoid curves, along its perimeter, and has a plurality of through holes 30a and 30b penetrating from one side end face to the other side end face. The through holes 30a are equidistantly formed along a circumference direction centered on the center (center of axial rotation) of the curved plate 26a, and more specifically, formed in a radially center region between the outer perimeter and the inner circumference of the curved plate 26a to receive the inner pins 31 which will be described later. The through hole 30b is formed at the center (center of axial rotation) of the curved plate 26a and forms the inner circumference of the curved plate 26a. The curved plate 26a is rotatably mounted on the outer circumference of the eccentric member 25a so as to rotate relative to the eccentric member 25a.

More specifically, the curved plate 26a is supported by a rolling bearing 41 so as to rotate relative to the eccentric member 25a. The inner circumferential surface of the rolling bearing 41 engages with the outer circumferential surface of the eccentric member 25a. The rolling bearing 41 is a cylindrical roller bearing including an inner ring member 42 having an inner raceway 42a on its outer circumferential surface, an outer raceway 43 directly formed in the inner circumferential surface of the through hole 30b of the curved plate 26a, a plurality of cylindrical rollers 44 disposed between the inner raceway 42a and outer raceway 43, and a retainer (not shown) that retains the interval between the adjacent cylindrical rollers 44 along the circumferential direction. The rolling bearing 41 can be a deep groove ball bearing. The inner ring member 42 further includes a pair of shoulders axially opposed to each other on the inner raceway 42a on which the cylindrical rollers 44 roll. The cylindrical rollers 44 are retained between the shoulders. The curved plate 26b is configured in the similar manner.

The outer pins 27 are equidistantly provided along a circumferential track centered on the rotational axis O of the input shaft 25. The outer pins 27 extend in parallel with the axis O and are held at the opposite ends by outer-pin holders 45 fixedly fitted in an inner wall of the speed-reduction-unit casing 22b, which encloses the speed reduction unit B, of the casing 22. More specifically, the opposite ends of the outer pins 27 along the axis O are rotatably supported by needle roller bearings 27a attached to the outer-pin holders 45.

When the curved plates 26a, 26b make orbital motion around the rotational axis O of the input shaft 25, the curved waveforms engage with the outer pins 27 to cause the curved plates 26a, 26b to make axial rotation. In addition, the needle roller bearings 27a attached to the opposite ends of the outer pins 27 reduce frictional resistance between the curved plates 26a, 26b and the outer pins 27 abutting the outer perimeters of the curved plates 26a, 26b.

The motion conversion mechanism includes a plurality of inner pins 31, serving as inner engagement members, implanted in the flange portion 28a of the output shaft 28 and through holes 30a formed in the curved plates 26a, 26b. The inner pins 31 are equidistantly provided on a circumferential track centered on the rotational axis of the output shaft 28, extend in parallel with the axis of the output shaft 28, and have base ends secured to the output shaft 28. In addition, needle roller bearings 31a, each made up with a hollow cylinder and needle rollers, are provided on the outer circumferential surfaces of the inner pins 31. The needle roller bearings 31a reduce frictional resistance between the curved plates 26a, 26b and the inner pins 31 abutting on the inner circumferential surfaces of the through holes 30a of the curved plates 26a, 26b.

The tip ends of the inner pins 31 are fixedly coupled with an inner-pin reinforcing member 31b for reinforcing the inner pins 31 by press-fitting the tip ends into the inner-pin reinforcing member 31b. The inner-pin reinforcing member 31b includes an annular flange portion 31c for connecting the tip ends of the inner pins 31 and a cylindrical tubular portion 31d connected with the inner circumference of the flange portion 31c and extending in an axial direction away from the inner pins 31. The inner-pin reinforcing member 31b, which reinforces the plurality of inner pins 31, evenly distributes the loads on some inner pins 31 applied by the curved plates 26a, 26b to all inner pins 31.

The inner pins 31 pass through the through holes 30a formed in radial parts of the curved plates 26a, 26b between the perimeter of the curved plates 26a, 26b and the axis of the input shaft 25. The through holes 30a are formed so as to correspond to the inner pins 31, respectively. In addition, the diameter of the through holes 30a is designed to be larger by a predetermined size than the outer diameter of the inner pins 31 (referring to "the maximum outer diameter including the outer diameter of the needle roller bearings 31a", and the same is applied hereinafter). Therefore, the inner pins 31 extending through the through holes 30a formed in the curved plates 26a, 26b function as inner engagement members respectively engaged with the through holes 30a.

The tubular portion 31d is drivingly connected with a lubrication oil pump 51. When the plurality of inner pins 31 revolve with the output shaft 28, the tubular portion 31d rotated by the inner pins 31 drives the lubrication oil pump 51. The lubrication oil pump 51 provided inside the casing 22 is driven by an output of the motor unit A to circulate lubrication oil through the in-wheel motor drive assembly 21.

The wheel hub bearing unit C includes a wheel hub 32 fixedly coupled with the output shaft 28, a wheel-hub-bearing outer ring 22c rotatably supporting the wheel hub 32, and a wheel hub bearing 33 rotatably holding the wheel hub 32 relative to the wheel-hub-bearing outer ring 22c. In addition, the wheel hub bearing unit C is arranged on one axial end of the speed reduction unit B. Therefore, the motor unit A, speed reduction unit B and wheel hub bearing unit C are coaxially aligned with the axis O in this order in a line.

The wheel hub bearing 33 is a double row angular ball bearing whose inner raceway is formed in the outer circumferential surface of the wheel hub 32. The outer raceway of the wheel hub bearing 33 is formed in an inner circumferential surface of the roughly-cylindrical wheel-hub-bearing outer ring 22c included in the casing 22. The wheel hub 32 includes a cylindrical hollow portion 32a connected with an end of the output shaft 28 and a flange portion 32b formed on an end of the wheel hub 32, the end being remote from the speed reduction unit B. The flange portion 32b is fixedly coupled to a road wheel (not shown) with bolts 32c.

Referring to FIG. 3, the flange portion 22e includes coupling portions 61, 62 used to couple with members of a vehicle body. The coupling portion 61 integrally connected with the flange portion 22e is positioned frontward with respect to the axis O, projects radially outward of the motor-unit casing 22a and is directed downwardly. The coupling portion 61 has a lower end surface 61u formed on the projecting end thereof. The coupling portion 62 integrally connected with the flange portion 22e is positioned rearward with respect to the axis O, projects radially outward of the motor-unit casing 22a and is directed downwardly. The coupling portion 62 has a lower end surface 62u formed on the projecting end thereof. The lower end surfaces 61*u*, 62*u* are positioned below the axis O and form common planes below the outer circumference of the motor-unit casing 22*a*.

The coupling portions 61, 62 are coupled with a suspension member, which is a member of the vehicle body, to suspend the in-wheel motor drive assembly 21 together with a wheel (not shown) from the vehicle body. In the present example, the flange portion 22*e* includes the front coupling portion 61 arranged frontward with respect to the axis and projecting downwardly and the rear coupling portion 62 arranged rearward with respect to the axis and projecting downwardly.

According to the example, the coupling portions 61 and 62 are arranged separately from each other at the front and rear of the wheel hub 32, respectively. Such coupling portions 61, 62 are fixedly secured to a trailing arm, extending frontward and rearward, of the suspension system in a suitable manner. Specifically, the coupling portions 61, 62 have bolt holes extending upward from the lower end surfaces, and the trailing arm (not shown) in contact with the lower end surfaces 61*u*, 62*u* are secured together with bolts.

As described above, the flange portion 22*e* has the coupling portions 61, 62 to couple the in-wheel motor drive assembly 21 with the member of the vehicle body. With the coupling portions 61, 62, the motor unit A is cantilevered by the flange portion 22*e*, while the speed reduction unit B and wheel hub bearing unit C are interposed between the wheel and the member of the vehicle body.

A wheel load to be imposed on the wheel supporting the vehicle body is transmitted from the vehicle body and carried, via the coupling portions 61, 62, by the flange portion 22*e*, speed-reduction-unit casing 22*b*, outer ring 22*c*, wheel hub bearing 33 and wheel hub 32 in this order of succession. Accordingly, the wheel load does not reach the motor unit A. The external force generated by sudden acceleration and deceleration and road roughness also does not reach the motor unit A. Therefore, deformation of the motor unit A can be properly prevented. In addition, it is possible to provide a light-weight in-wheel motor drive assembly 21 by forming the motor-unit casing 22*a* with a thin material. Consequently, the unsprung weight of the suspension system can be reduced, thereby improving the riding comfort of the vehicle.

Although the trailing arm is subjected to elastic deformation in accordance with changes in the wheel load, providing greater rigidity to the flange portion 22*e* prevents the trailing arm deformation from affecting the in-wheel motor drive assembly 21.

The operating principles of the thus configured in-wheel motor drive assembly 21 will be described in detail.

In the motor unit A, for example, a stator 23 generates electromagnetic force with AC current supplied to a coil of the stator 23, and a rotor 24 made of a permanent magnet or magnetic material receives the electromagnetic force that rotates the rotor 24.

The rotation of the rotor 24 allows a motor rotary shaft 35 connected with the rotor 24 to output rotation, and the rotation of the motor rotary shaft 35 and an input shaft 25 causes curved plates 26*a*, 26*b* to make orbital motion around a rotational axis O of the input shaft 25. At that time, outer pins 27 roll on the curved waveforms of the curved plates 26*a*, 26*b* so as to engage therewith to cause the curved plates 26*a*, 26*b* to make axial rotation in the reverse direction of the input shaft's 25 rotation.

Inner pins 31, which are inserted in the through holes 30*a* and are sufficiently smaller in diameter than the through holes 30*a*, abut against the walls of the through holes 30*a* with the axial rotation of the curved plates 26*a*, 26*b*. Thus, the orbital motion of the curved plates 26*a*, 26*b* is not transmitted to the inner pins 31, but only the axial rotation of the curved plates 26*a*, 26*b* is transmitted to the wheel-hub bearing unit C via the output shaft 28. As described above, the through holes 30*a* and inner pins 31 play a role of a motion conversion mechanism.

Through the motion conversion mechanism, the output shaft 28, which is connected with and coaxially aligned with the input shaft 25, extracts the axial rotation of the curved plates 26*a*, 26*b* as an output of the speed reduction unit B. Consequently, the rotational speed of the input shaft 25 is reduced by the speed reduction unit B and transmitted to the output shaft 28. Even if the adopted motor unit A produces a low torque at a high rotational speed, adequate torque required for the driving wheels can be transmitted.

A reduction ratio of the above-described speed reduction unit B is calculated by $(Z_A - Z_B)/Z_B$, wherein $Z_A$ represents the number of the outer pins 27 and $Z_B$ represents the number of the waveforms of the curved plates 26*a*, 26*b*. In the example shown in FIG. 2 where $Z_A = 12$ and $Z_B = 11$, the reduction ratio results in 1/11, which is a considerably high reduction ratio.

Adoption of such a cycloid speed reduction mechanism, capable of obtaining a high reduction ratio without multi-stage configuration, as the speed reduction unit B can provide a compact in-wheel motor drive assembly 21 with a high reduction ratio.

Figure 4:
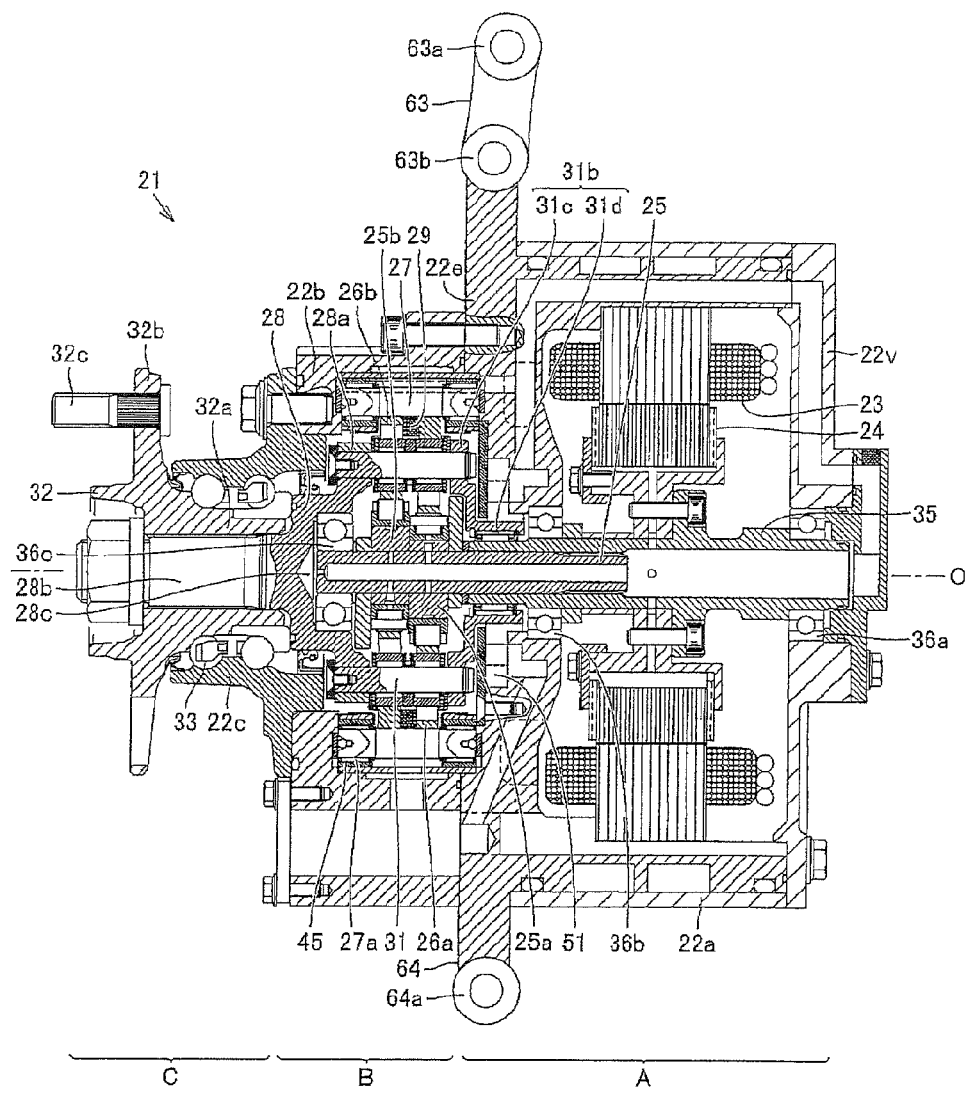
FIG. 4 is a vertical cross-sectional view of an in-wheel motor drive assembly according to the second example of the present invention.

With reference to the vertical cross-sectional view in FIG. 4, the second example of the present invention will be described. Through the second example, components common with those in the first example are marked with the same numerals as the first example and will not be further explained, but different components will be described below. In the second example, the flange portion 22*e* has coupling portions 63, 64 to couple with members of the vehicle body. The coupling portion 63 integrally connected with the flange portion 22*e* is positioned above the axis O and projects radially outward of the motor-unit casing 22*a*. Coupling portions 63*a*, 63*b* are formed on an upwardly projecting end of the coupling portion 63. The coupling portion 64 integrally connected with the flange portion 22*e* is positioned below the axis O and projects radially outward of the motor-unit casing 22*a*. A coupling portion 64*a* is formed on a downwardly projecting end of the coupling portion 64.

These coupling portions 63*a*, 63*b*, 64*a* are coupled with suspension members which are members of the vehicle body. The in-wheel motor drive assembly 21 of the second example shown in FIG. 4 is properly mounted on a strut type suspension system. Specifically, the coupling portions 63*a*, 63*b* are coupled with a lower end of a strut (not shown) extending vertically. The coupling portion 64*a* may include, for example, a ball joint that is coupled with a free end of a lower arm (not shown) extending in the width direction of the vehicle. The lower arm may be a well-known arm having a base end, which is an inner end in the width direction of the vehicle, and a free end, which is an outer end in the width direction of the vehicle.

With reference to a vertical cross-sectional view in FIG. 5, the third example of the present invention will be described. Through the third example, components common with those in the previous examples are marked with the same numerals as the previous examples and will not be further explained, but different components will be described below. In the third example, the flange portion 22*e* has coupling portions 63, 64 to couple with members of a vehicle body. The third example also provides a motor-side coupling portion 65 at an end of the motor unit A to couple with a member of the vehicle body. The end is positioned opposite to the speed reduction unit B along the axis O.

Figure 5:
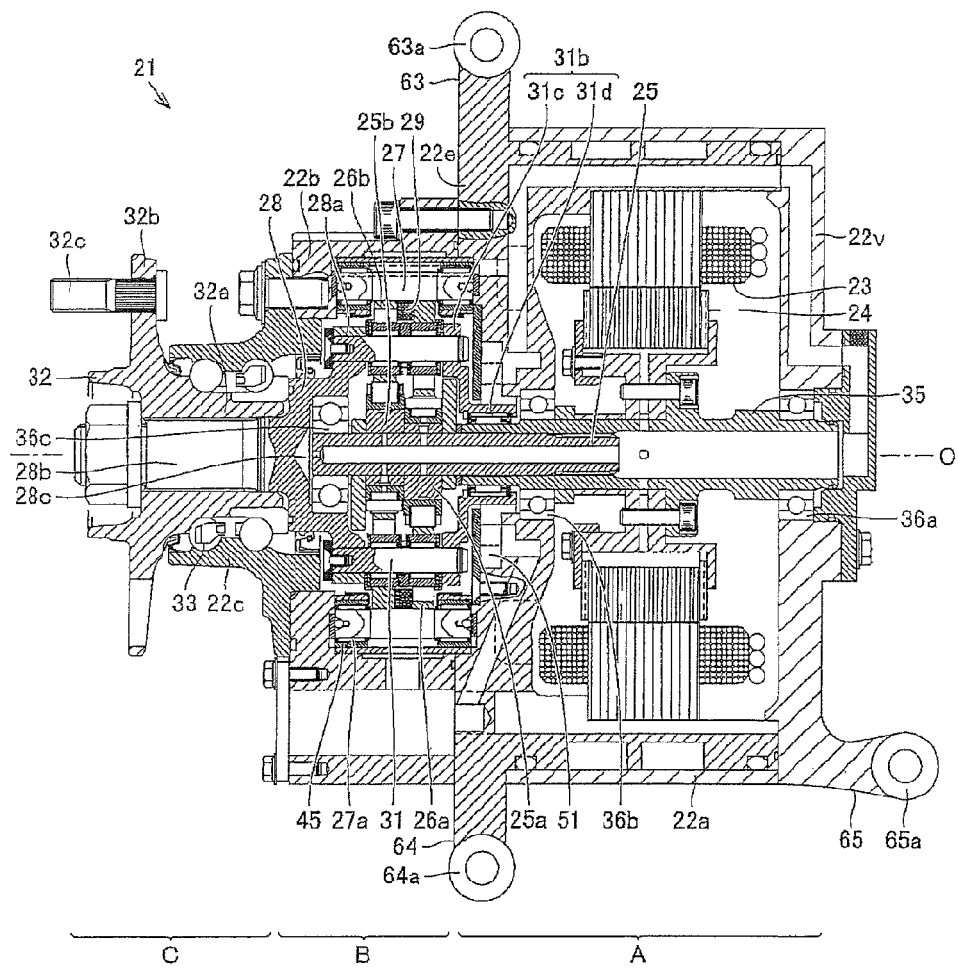
FIG. 5 is a vertical cross-sectional view of an in-wheel motor drive assembly according to the third example of the present invention.

In the in-wheel motor drive assembly 21 of the third example shown in FIG. 5, an upper coupling portion 63 has a coupling portion 63a on its end and a lower coupling portion 64 has a coupling portion 64a on its end. The in-wheel motor drive assembly 21 in FIG. 5 is properly mounted on a double wishbone type suspension system.

Figure 6:
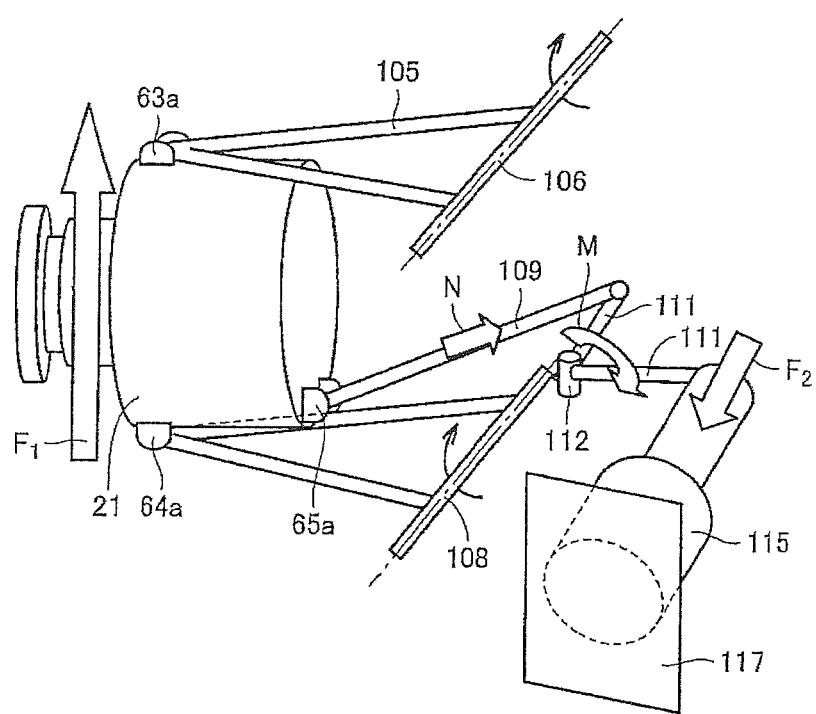
FIG. 6 is a perspective view schematically showing the in-wheel motor drive assembly of the third example suspended from a suspension system.

FIG. 6 is a perspective view schematically showing the suspension system suspending the in-wheel motor drive assembly 21 in FIG. 5. Referring to FIG. 6, the upper coupling portion 63a may include, for example, a ball joint that is coupled with a free end of an upper arm 105 extending in the width direction of the vehicle. The upper arm 105 swings up and down with respect to an inner end 106, serving as a base end, of the vehicle in the width direction. The lower coupling portion 64a may include, for example, a ball joint that is coupled with a free end of a lower arm 107 extending in the width direction of the vehicle. The lower arm 107 swings up and down about an inner end 108, serving as a base end, of the vehicle in the width direction.

The motor-side coupling portion 65 is a coupling portion that is used to couple with a shock absorber (also referred to as "damper"), which is provided on the vehicle body, and is arranged at a lower area of an end of the motor. The motor-side coupling portion 65 is integrally connected with a motor cover 22v and projects from the motor cover 22v in an opposite direction to the speed reduction unit B. A coupling portion 65a is provided on the projecting end of the motor-side coupling portion 65. The motor-side coupling portion 65 can be positioned anywhere on the outer circumferential edge of the motor unit A, and also can be integrally connected with the motor-unit casing 22a.

The coupling portion 65a may include, for example, a ball joint that is coupled with at least an outer end of a straight link member 109 extending in the width direction of the vehicle. An inner end of the link member 109 is coupled with one end of a roughly L-shaped link member 111. The link member 111 is supported at its center part by a pivot 112 so that the link member 111 can pivot about the pivot 112. The other end of the link member 111 is coupled with a front end of a damper 115. The damper 115 is transversely disposed so as to extend and compress in the longitudinal direction of the vehicle body and is attached at its rear end to the vehicle body 117.

Functions of the suspension system shown in FIG. 6 will be described. The description will be made with an exemplary case in which an upward shock load F1 from a road surface is input via a wheel to the in-wheel motor drive assembly 21 and causes the in-wheel motor drive assembly 21 to be lifted higher than its original position. As shown by arrows, the upper arm 105 and lower arm 107 swing upward with the upward movement of the in-wheel motor drive assembly 21. The upward swing pulls the in-wheel motor drive assembly 21 inward in the width direction of the vehicle, and an axial force N acts on the link member 109. Since the link member 109 intersects with the front end of the link member 111, the axial force N acting on the link member 111 is converted into a moment M. Since the damper 115 extends in a longitudinal direction of the vehicle and intersects with the rear end of the link member 111, the moment M is converted into a shock load F2 that acts on the damper 115. When the shock load F2 pushes a front end of the damper 115 to the rear of the vehicle, the damper 115 absorbs the shock load F2 and slowly pushes back the rear end of the link member 111. At last, the in-wheel motor drive assembly 21 is restored to the original position. Although a downward shock load applied to the in-wheel motor drive assembly 21 is not shown, the downward shock load is also absorbed by the damper 115 in a similar manner.

Figure 7:
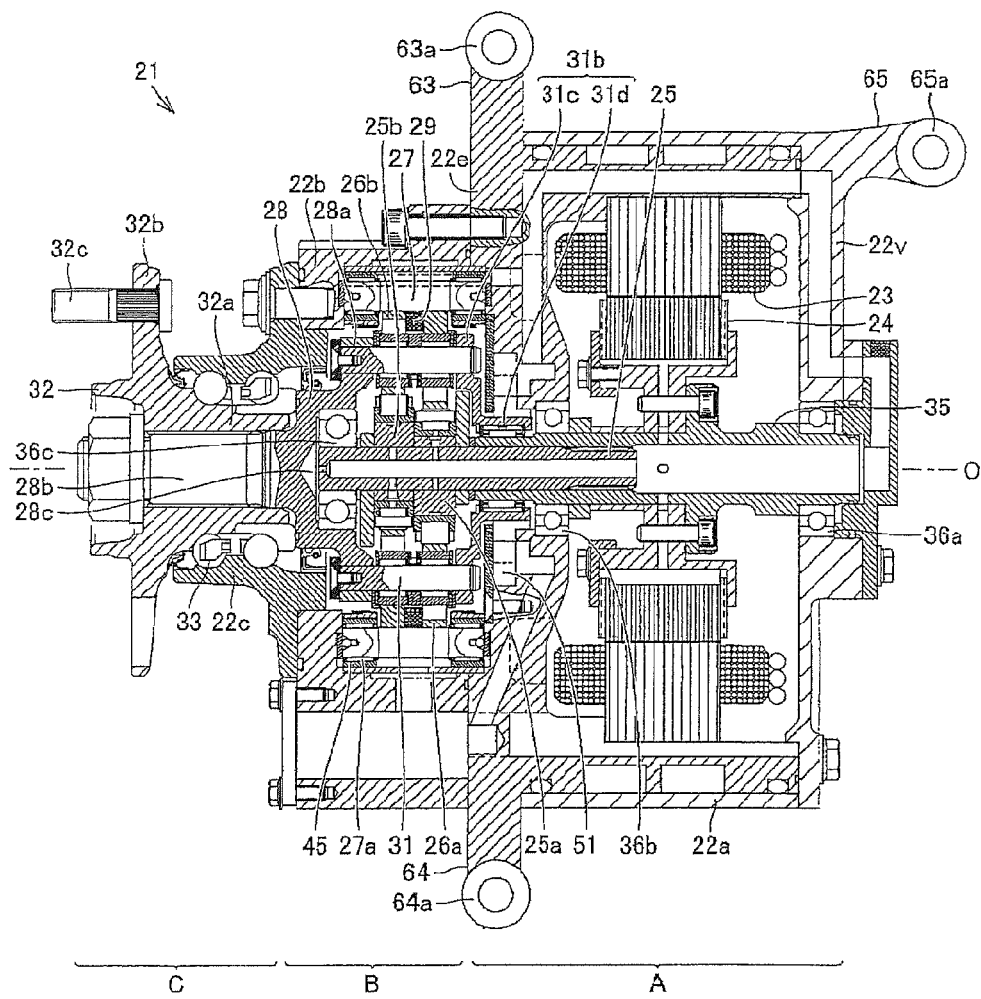
FIG. 7 is a vertical cross-sectional view of an in-wheel motor drive assembly according to the fourth example of the present invention.

With reference to a vertical cross-sectional view in FIG. 7, the fourth example of the present invention will be described. Through the fourth example, components common with those in the previous examples are marked with the same numerals as the previous examples and will not be further explained, but different components will be described below. In the fourth example, a motor-side coupling portion 65 is provided at an upper area of an end of the motor. An upper coupling portion 63 and a lower coupling portion 64 are common with those in the third example (FIG. 5). The in-wheel motor drive assembly 21 in FIG. 7 is properly attached to a double wishbone type suspension system. In addition, upward and downward shock loads can be absorbed by a transversely-disposed damper 115, which is not shown in FIG. 7.

With reference to a vertical cross-sectional view in FIG. 8, the fifth example of the present invention will be described. Through the fifth example, components common with those in the previous examples are marked with the same numerals as the previous examples and will not be further explained, but different components will be described below. In the fifth example, a coupling portion 64 is disposed below a wheel hub. The motor unit A has a motor-side coupling portion 66 to couple with a member of a vehicle body, positioned at an upper area of an end of the motor unit A that is an axially opposite end to the speed reduction unit B. The motor-side coupling portion 66 is integrally connected with a motor cover 22v and projects from the motor cover 22v in an opposite direction to the speed reduction unit B. A coupling portion 66a is provided on a projecting end of the motor-side coupling portion 66. The motor-side coupling portion 66 can be positioned anywhere on the outer circumferential edge of the motor unit A, and also can be integrally connected with the motor-unit casing 22a. The in-wheel motor drive assembly 21 in FIG. 8 is properly attached to a double wishbone type suspension system.

Figure 8:
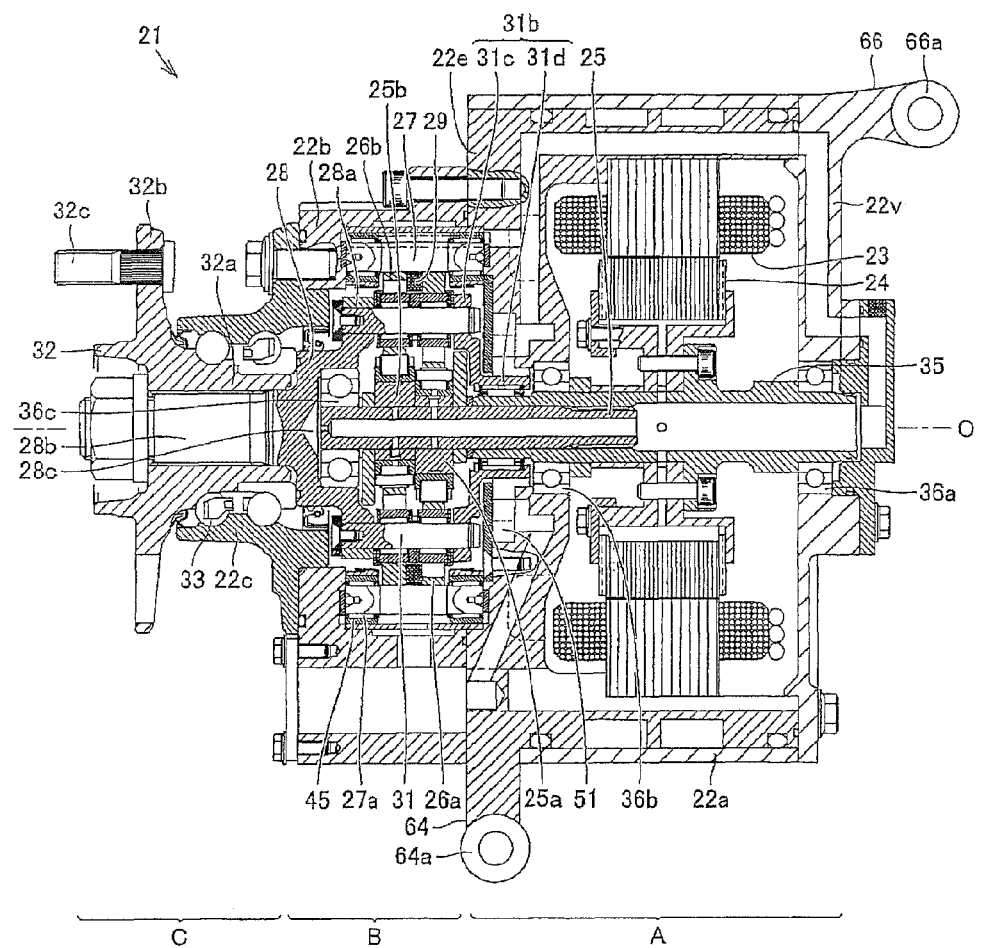
FIG. 8 is a vertical cross-sectional view of an in-wheel motor drive assembly according to the fifth example of the present invention.
Figure 9:
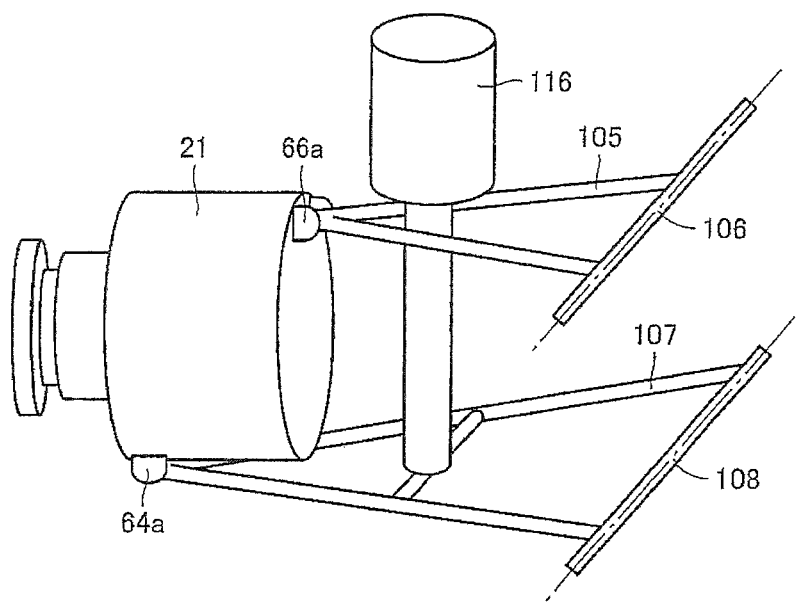
FIG. 9 is a perspective view schematically showing the in-wheel motor drive assembly of the fifth example suspended from a suspension system.

FIG. 9 is a perspective view schematically showing a suspension system suspending the in-wheel motor drive assembly 21 in FIG. 8. Referring to FIG. 9, an upper coupling portion 66a may include, for example, a ball joint that is coupled with a free end of an upper arm 105 extending in the width direction of the vehicle. A lower coupling portion 64a may include, for example, a ball joint that is coupled with a free end of a lower arm 107 extending in the width direction of the vehicle. A damper 116 is vertically disposed so as to extend and compress in a vertical direction of the vehicle body and has a lower end coupled to a center area of the lower arm 107 in the width direction of the vehicle. An upper end of the damper 116 is attached to the vehicle body.

Since the damper 116 of the suspension system in FIG. 9 extends through the upper arm 105, the in-wheel motor drive assembly 21 and components under the vehicle body including the suspension system can be placed in a compact fashion.

In addition, the suspension system in FIG. 9 permits the damper 116 to absorb the vertical shock loads applied from the road to the in-wheel motor drive assembly 21 via a wheel, after passing through the wheel hub 32, wheel hub bearing 33, outer ring 22c, speed-reduction-unit casing 22b and flange portion 22e in this order of succession, thereby preventing the shock loads from acting on the motor unit A. Therefore, deformation of the motor unit A can be suitably prevented. Furthermore, it is possible to provide a light-weight in-wheel motor drive assembly 21 by forming the motor-unit casing 22a with a thin material. Consequently, the unsprung weight of the suspension system can be reduced, thereby improving the riding comfort of the vehicle.

A possible modification of the example in FIG. 8, though it is not shown in the drawings, includes a coupling portion 63 disposed above the axis, instead of the lower coupling portion 64, and a motor-side coupling portion 66 disposed at a lower area of the end of the motor rather than the upper area of the end of the motor. Even in the modification, the in-wheel motor drive assembly is properly attached to a double wishbone type suspension system. Specifically, the coupling portion 63 on an upper side of the flange portion 22e is coupled with an upper arm that is coupled with a damper. A motor-side coupling portion at a lower area of the end of the motor is coupled with a lower arm.

According to the modification, the weight of the in-wheel motor drive assembly 21 can be reduced by thinning the motor-unit casing 22a.

In the aforementioned examples in which the flange portion 22e is located in proximity of a wheel, a brake caliper can be provided to the flange portion 22e to brake the wheel. To attach the brake caliper, the flange portion 22e has a caliper coupling portion. This configuration makes a unit including a wheel brake and in-wheel motor drive assembly 21 compact.

Figure 10:
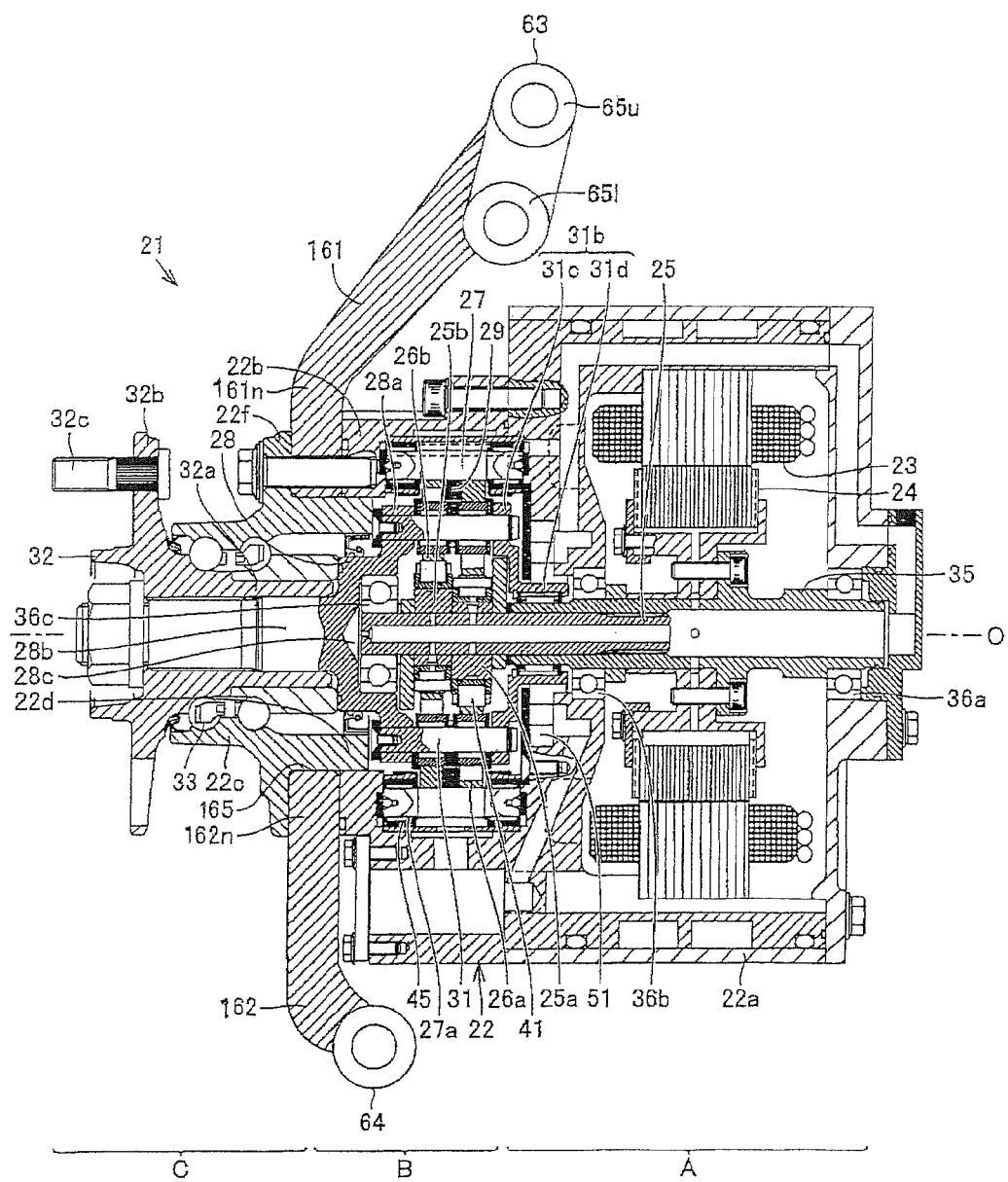
FIG. 10 is a vertical cross-sectional view of an in-wheel motor drive assembly according to the sixth example of the present invention.
Figure 11:
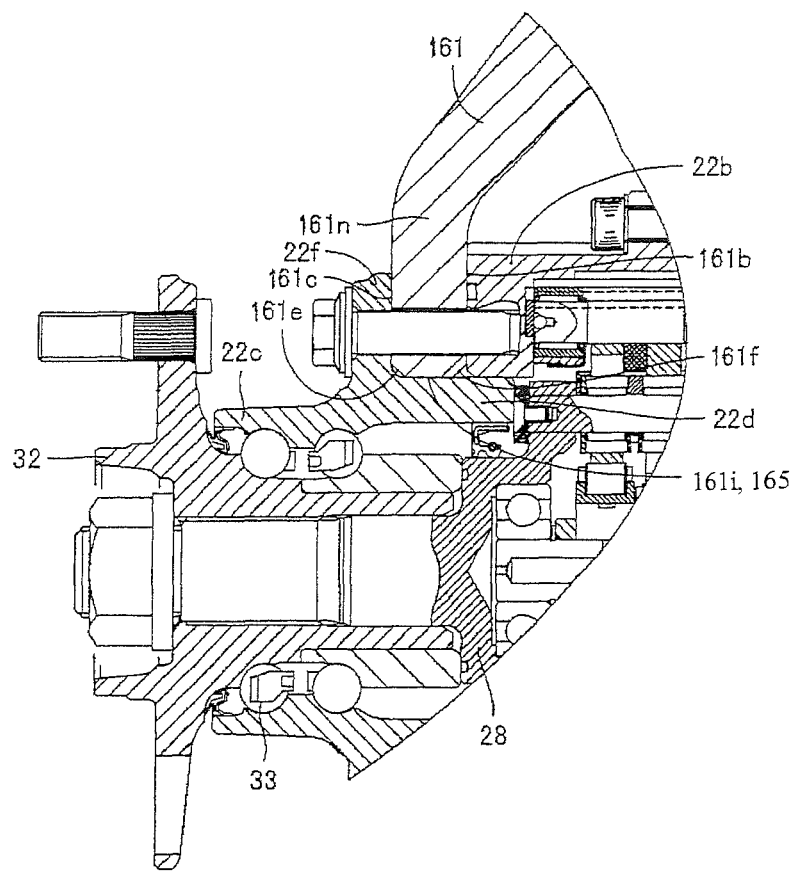
FIG. 11 is a vertical cross-sectional view showing an enlarged root end part of a coupling member according to the sixth example.

With reference to a vertical cross-sectional view in FIG. 10, the sixth example of the present invention will be described. FIG. 10 is a vertical cross-sectional view of an in-wheel motor drive assembly of the sixth example. FIG. 11 is a vertical cross-sectional view of an enlarged root end part of a coupling member according to the example. The transverse cross-sectional view in FIG. 2 showing the first example is also a transverse sectional view showing the speed reduction unit of the sixth example.

An in-wheel motor drive assembly 21, which is disposed in an interior space of a road wheel and drives the wheel, includes a motor unit A that generates driving force, a speed reduction unit B that reduces the rotational speed of the motor unit A and outputs the reduced rotation, and a wheel hub bearing unit C that transmits the output from the speed reduction unit B to the driving wheel (not shown). The motor unit A, speed reduction unit B, wheel hub bearing unit C are coaxially aligned in this order in a line. The in-wheel motor drive assembly 21 is mounted in a wheel housing of, for example, an electric vehicle or hybrid drive vehicle.

The motor unit A is a radial gap motor including a motor-unit casing 22a that forms a contour of the motor unit A, a stator 23 that is secured to the motor-unit casing 22a, a rotor 24 that is arranged so as to face the inner side of the stator 23 with a radial gap therebetween, and a motor rotary shaft 35 that is fixedly coupled with the inner side of the rotor 24 to rotate together with the rotor 24.

The motor-unit casing 22a is in a cylindrical shape and has an end along an axis O (left side in FIG. 1) connected with an end of a speed-reduction-unit casing 22b. The stator 23 is supported by the inner circumferential surface of the motor-unit casing 22a. The motor rotary shaft 35 is supported by opposite ends of the motor unit A with rolling bearings 36a, 36b.

The speed reduction unit B includes a speed-reduction-unit casing 22b that forms a contour of the speed reduction unit B and an output shaft 28 that reduces the rotational speed of the motor rotary shaft 35 and outputs it, and is disposed on one side of the motor unit A along the axis O. Specifically, the speed reduction unit B adopts a cycloid reduction mechanism. The speed reduction unit B has an input shaft 25 extending along the axis O so as to project toward the motor unit A, and the projecting end is fixedly coupled with an axial end of the motor rotary shaft 35. The motor rotary shaft 35 of the motor unit A and the input shaft 25 of the speed reduction unit B that rotate together are collectively referred to as a motor-side rotating member. The other end of the input shaft 25 that is remote from the motor unit A is supported by a rolling bearing 36c in the speed reduction unit B.

Two disc-like eccentric members 25a, 25b are fixed to the outer circumferential surface of the input shaft 25. The motor rotary shaft 35 and input shaft 25 are aligned with the rotational axis O of the in-wheel motor drive assembly 21, but the centers of the eccentric members 25a, 25b are not aligned with the axis O. In addition, the two eccentric members 25a, 25b are provided such that their phases are shifted by 180° in order to counterbalance the centrifugal forces generated by eccentric motion thereof.

Curved plates 26a, 26b, serving as revolution members, are rotatably held on the outer circumferential surface of the eccentric members 25a, 25b, respectively. The outer perimeter of the curved plates 26a, 26b are curved in the shape of waves and engages with a plurality of outer pins 27 serving as outer engagement members. The outer pins 27 are attached along the inner circumferential surface of the speed-reduction-unit casing 22b. A center collar 29 is provided in an interstice between the curved plates 26a and 26b to prevent the curved plates 26a, 26b from tilting.

The speed-reduction-unit casing 22b is in the shape of a cylinder having a diameter smaller than that of the motor-unit casing 22a and has one end along the axis O (right side of FIG. 10) connected with an end of the motor-unit casing 22a and the other end along the axis O (left side in FIG. 10) connected with an end of a wheel-hub-bearing outer ring 22c. The casings 22a, 22b, 22c make up a single casing 22. The casing 22 rotatably supports rotating elements housed therein with various bearings including the aforementioned rolling bearing 36a and a wheel hub bearing 33 which will be described later. Therefore, the inner circumferential surface of the speed-reduction-unit casing 22b is separated from the rotating elements, such as the curved plates 26a, 26b described below, and does not make contact with the rotating elements.

The output shaft 28 of the speed reduction unit B is in alignment with the rotational axis O and extends in one direction of the axis O from the speed reduction unit B to the wheel hub bearing unit C, and includes a flange portion 28a and a shaft portion 28b. The flange portion 28a disposed in the speed reduction unit B has an end face with holes equidistantly formed along the circumference centered on the rotational axis O of the output shaft 28. The holes receive inner pins 31 to fix them. A wheel hub 32 is fixedly coupled to the outer circumferential surface of the shaft portion 28b disposed in the wheel hub bearing unit C. The output shaft 28 of the speed reduction unit B and the wheel hub 32 of the wheel hub bearing unit C that rotate together are also collectively referred to as wheel-side rotating members. The inner pins 31 implanted in the flange portion 28a project in the other direction of the axis O and engage at their tip ends with radially center regions of the curved plates 26a, 26b. The flange portion 28a has a center bore 28c that receives one end of the input shaft 25 and rotatably supports the end of the input shaft 25 with the rolling bearing 36c so that the flange portion 28a rotates with respect to the input shaft 25.

Referring to FIG. 2, the curved plate 26a has a plurality of waveforms in the form of trochoid curves, such as epitrochoid curves, along its perimeter, and has a plurality of through holes 30a and 30b penetrating from one side end face to the other side end face. The through holes 30a are equidistantly formed along a circumference direction centered on the rotational axis of the curved plate 26a and more specifically, formed in a radially center region between the outer perimeter and the inner circumference of the curved plate 26a to receive the inner pins 31 which will be described later. The through hole 30b is formed at the center (center of axial rotation) of the curved plate 26a and forms the inner circumference of the curved plate 26a. The curved plate 26a is rotatably mounted on the outer circumferential surface of the eccentric member 25a so as to rotate relative to the eccentric member 25a.

More specifically, the curved plate 26a is rotatably supported by the rolling bearing 41 with respect to the eccentric member 25a. The inner circumferential surface of the rolling bearing 41 engages with the outer circumferential surface of the eccentric member 25a. The rolling bearing 41 is a cylindrical roller bearing including an inner ring member 42 having an inner raceway 42a on its outer circumferential surface, an outer raceway 43 directly formed in the inner circumferential surface of the through hole 30b of the curved plate 26a, a plurality of cylindrical rollers 44 disposed between the inner raceway 42a and outer raceway 43, and a retainer (not shown) that retains the interval between the adjacent cylindrical rollers 44 along the circumferential direction. The rolling bearing 41 can be a deep groove ball bearing. The inner ring member 42 further includes a pair of shoulders axially opposed to each other on the inner raceway 42a on which the cylindrical rollers 44 roll. The cylindrical rollers 44 are retained between the shoulders. The curved plate 26b is configured in a similar manner.

The outer pins 27 are equidistantly provided along a circumferential track centered on the rotational axis O of the input shaft 25. The outer pins 27 extend in parallel with the axis O and are held at the opposite ends by outer-pin holders 45 fixedly fitted in an inner wall of the speed-reduction-unit casing 22b, which encloses the speed reduction unit B, of the casing 22. More specifically, the opposite ends of the outer pins 27 along the axis O are rotatably supported by needle roller bearings 27a attached to the outer-pin holders 45.

When the curved plates 26a, 26b make orbital motion around the rotational axis O of the input shaft 25, the curved waveforms engage with the outer pins 27 to cause the curved plates 26a, 26b to make axial rotation. In addition, the needle roller bearings 27a attached to the opposite ends of the outer pins 27 reduce frictional resistance between the curved plates 26a, 26b and the outer pins 27 abutting on the outer perimeters of the curved plates 26a, 26b.

The motion conversion mechanism includes a plurality of inner pins 31, serving as inner engagement members, implanted in the flange portion 28a of the output shaft 28 and through holes 30a formed in the curved plates 26a, 26b. The inner pins 31 are equidistantly provided on a circumferential track centered on the rotational axis of the output shaft 28, extend in parallel with the axis of the output shaft 28, and have base ends secured to the output shaft 28. In addition, needle roller bearings 31a with hollow cylindrical rollers or needle rollers are provided on the outer circumferential surface of the inner pins 31. The needle roller bearings 31a reduce frictional resistance between the curved plates 26a, 26b and the inner pins 31 abutting on the inner circumferential surface of the through holes 30a of the curved plates 26a, 26b.

The tip ends of the inner pins 31 are fixedly coupled with an inner-pin reinforcing member 31b for reinforcing the inner pins 31 by press-fitting the tip ends into the inner-pin reinforcing member 31b. The inner-pin reinforcing member 31b includes an annular flange portion 31c for connecting the tip ends of the inner pins 31 and a cylindrical tubular portion 31d connected with the inner circumference of the flange portion 31c and extending in an axial direction away from the inner pins 31. The inner-pin reinforcing member 31b, which reinforces the multiple inner pins 31, evenly distributes the loads on some inner pins 31 applied by the curved plates 26a, 26b to all inner pins 31.

The inner pins 31 pass through the through holes 30a formed in radial parts of the curved plates 26a, 26b between the perimeter of the curved plates 26a, 26b and the axis of the input shaft 25. The through holes 30a are formed so as to correspond to the inner pins 31, respectively. In addition, the diameter of the through holes 30a is set to be larger by a predetermined size than the outer diameter of the inner pins 31 (referring to "the maximum outer diameter including the outer diameter of the needle roller bearings 31a", and the same is applied hereinafter). Therefore, the inner pins 31 extending through the through holes 30a formed in the curved plates 26a, 26b function as inner engagement members respectively engaged with the through holes 30a.

The tubular portion 31d is drivingly connected with a lubrication oil pump 51. When the plurality of inner pins 31 revolve with the output shaft 28, the tubular portion 31d rotated by the inner pins 31 drives the lubrication oil pump 51. The lubrication oil pump 51 provided inside the casing 22 is driven by an output of the motor unit A to circulate lubrication oil through the in-wheel motor drive assembly 21.

The wheel hub bearing unit C includes a wheel hub 32 fixedly coupled with the output shaft 28, a wheel-hub-bearing outer ring 22c rotatably supporting the wheel hub 32, and a wheel hub bearing 33 rotatably holding the wheel hub 32 relative to the wheel-hub-bearing outer ring 22c. In addition, the wheel hub bearing unit C is arranged on one axial end of the speed reduction unit B. Therefore, the motor unit A, speed reduction unit B and wheel hub bearing unit C are coaxially aligned with the axis O in this order in a line.

The wheel hub bearing 33 is a double row angular ball bearing whose inner raceway is formed in the outer circumferential surface of the wheel hub 32. The outer raceway of the wheel hub bearing 33 is formed in an inner circumferential surface of the roughly-cylindrical wheel-hub-bearing outer ring 22c included in the casing 22. The wheel hub 32 includes a cylindrical hollow portion 32a connected with an end of the output shaft 28 and a flange portion 32b formed on an end of the wheel hub 32, the end being remote from the speed reduction unit B. The flange portion 32b is fixedly coupled to a road wheel (not shown) with bolts 32c.

An upper coupling member 161 and a lower coupling member 162 are secured to the wheel-hub-bearing outer ring 22c (FIG. 10). The upper coupling member 161 is an arm-like coupling member extending radially outward of the axis O from its root end part 161n secured to the casing 22. The upper coupling member 161 has on its projecting end a coupling portion 63 used to couple with a member of the vehicle body (not shown). The coupling portion 63 is located above the casing 22 and includes an upper coupling portion 65u and a lower coupling portion 65l.

A casing projecting portion 22d projecting in the direction of the axis O from the wheel-hub-bearing outer ring 22c toward the speed reduction unit B is inserted radially inside of the root end part 161n. The projecting end of the casing projecting portion 22d fits in the speed-reduction-unit casing 22b. The casing projecting portion 22d is in the shape of a cylinder centered on the axis O. Alternatively, the casing projecting portions 22d are arranged in the circumferential direction with intervals therebetween around the axis O as the center. The wheel-hub-bearing outer ring 22c has a casing flange portion 22f projecting radially outward of the casing projecting portion 22d. The coupling member 161 is secured to the wheel-hub-bearing outer ring 22c with the root end part 161n placed on the outer circumferential surface of the casing projecting portion 22d and the casing flange portion 22f.

The lower coupling member 162 is an arm-like coupling member extending radially outward of the axis O from its root end part 162n secured to the casing 22. The lower coupling member 162 has on its end a coupling portion 64 used to fixedly couple with a member of the vehicle body (not shown). The coupling portion 64 is located below the casing 22. The lower coupling member 162 is secured to the wheel-hub-bearing outer ring 22c with the root end part 162n placed on the outer circumferential surface of the casing projecting portion 22d and the casing flange portion 22f.

In the example shown in FIG. 10, the upper coupling member 161 and lower coupling member 162 are attached to a well-known strut type suspension system having a strut member and a lower arm. Specifically, the upper coupling portion 65u and lower coupling portion 65l of the upper coupling member 161 are fixedly coupled with a lower end portion of a strut member (not shown) extending vertically. An example of the strut member is retractable and has an upper end coupled with the vehicle body. For a strut member slightly tilted in the vertical direction, the upper coupling portion 65u and lower coupling portion 65l are positioned differently with respect to the axis O as shown in FIG. 10. The differently positioned upper coupling portion 65u and lower coupling portion 65l can be attached properly to the tilting strut member.

The coupling portion 64 of the lower coupling member 162 is coupled with a free end of a lower arm (not shown) extending in the width direction of the vehicle. A ball joint is useful to couple them. An example of the lower arm is vertically swingable and has a base end coupled with the vehicle body.

According to the example shown in FIG. 10, the in-wheel motor drive assembly 21 includes the upper coupling member 161 and lower coupling member 162 as coupling members for coupling the in-wheel motor drive assembly 21 with the members of the vehicle body. This configuration allows the in-wheel motor drive assembly 21 to be suspended from the vehicle body with a wheel fixedly coupled to the wheel hub 32.

A wheel load to be imposed on the wheel supporting the vehicle body is transmitted from the vehicle body, via the upper coupling portion 65u and lower coupling portion 65l, to the wheel-hub-bearing outer ring 22c, wheel hub bearing 33 and wheel hub 32 in this order of succession, and supported by the wheel. Accordingly, the wheel load does not reach the motor unit A and speed reduction unit B. The external force generated by sudden acceleration and deceleration and road roughness also does not reach the motor unit A and speed reduction unit B. Therefore, deformation of the motor unit A and speed reduction unit B can be properly prevented. In addition, the in-wheel motor drive assembly 21 can be reduced in weight by making the motor-unit casing 22a and speed-reduction-unit casing 22b thin. Consequently, the unsprung weight of the suspension system can be reduced, thereby improving the riding comfort of the vehicle.

According to the example shown in FIG. 10, the in-wheel motor drive assembly 21 includes the upper coupling member 161 located above the axis O and the lower coupling member 162 located below the axis O. Such coupling members enable attachment of the in-wheel motor drive assembly 21 to the strut type suspension system in a preferable manner.

According to the example shown in FIG. 10, the wheel-hub-bearing outer ring 22c has the casing projecting portion 22d projecting toward the speed-reduction-unit casing 22b to fit in the speed-reduction-unit casing 22b. The coupling members 161, 162 are interposed between the wheel-hub-bearing outer ring 22c and speed-reduction-unit casing 22b on the radially outside of the casing projecting portion 22d. This configuration can reinforce the entire casing 22 to thereby enhance the rigidity of the in-wheel motor drive assembly 21.

Referring to FIG. 11, an end of the root end part 161n of the upper coupling member 161 is composed of an inner circumferential surface 161i in surface contact with the casing projecting portion 22d, one axial end face 161c in surface contact with the casing flange portion 22f of the wheel-hub-bearing outer ring 22c, and the other axial end face 161b in contact with the speed-reduction-unit casing 22b. The end face 161b and end face 161c are flat. A chamfer 161e is formed at the boundary between the inner circumferential surface 161i and end face 161c. An example of the chamfer 161e is in a rounded shape so as to seamlessly connect the end face 161c and inner circumferential surface 161i orthogonal to each other.

According to the example shown in FIG. 11, the chamfer 161e formed at the boundary between the radially-inside inner circumferential surface 161i and the end face 161c in contact with the wheel-hub-bearing outer ring 22c can relieve stress of the wheel load so that the stress is not intensively imposed on the end of the root end part 161n of the upper coupling member 161.

In addition, a chamfer 161f is formed at the boundary between the radially-inside inner circumferential surface 161i and an end face 161b in contact with the speed-reduction-unit casing 22b. The chamfer 161f can relieve stress that acts between the speed-reduction-unit casing 22b and wheel-hub-bearing outer ring 22c so that the stress is not intensively imposed on the end of the root end part 161n of the upper coupling member 161.

The upper coupling member 161 and lower coupling member 162 are integrally connected with the root end parts 161n and 162n and have a through bore 65 common for the root end parts 161n, 162n. The inner circumferential surface 161i is an inner circumferential surface of the through bore 65. The output shaft 28 and wheel hub 32 pass through the through bore 65.

According to the example, the coupling members have the through bore 65 at their root end parts that result in a coupling member with a ring shaped root end part. In addition, because the output shaft 28 passes through the through bore 65, the entire circumference of the root end part can be coupled to the adjacent casing 22, thereby enhancing the rigidity of connection between the casing 22 and the coupling members 161, 162.

In a modification, the upper coupling member 161 and lower coupling member 162 can be separate components. In the modification, a cut-away portion is formed at an end of the wheel-hub-bearing outer ring 22c, the end facing the speed-reduction-unit casing 22b, so as to extend radially inward from the outer circumferential surface of the wheel-hub-bearing outer ring 22c. The cut-away portion is formed in the upper and lower parts. The root end parts 161n, 162n of the coupling members 161, 162 fit in the cut-away portions, respectively.

According to the modification, fitting the root end parts of the coupling members 161 and 162 into the cut-away portions, which extend inwardly from the outer circumferential surface of the wheel-hub-bearing outer ring 22c, can enhance the rigidity of the connection between the wheel-hub-bearing outer ring 22c and the coupling members 161, 162. Note that similar cut-away portions can be provided to the speed-reduction-unit casing 22b.

The operating principles of the thus configured in-wheel motor drive assembly 21 will be described in detail.

In the motor unit A, for example, a stator 23 generates electromagnetic force with AC current supplied to a coil of the stator 23, and a rotor 24 made of a permanent magnet or magnetic material receives the electromagnetic force that rotates the rotor 24.

The rotation of the rotor 24 allows a motor rotary shaft 35 connected with the rotor 24 to output rotation, and the rotation of the motor rotary shaft 35 and an input shaft 25 causes curved plates 26a, 26b to make orbital motion around a rotational axis O of the input shaft 25. At that time, outer pins 27 roll on the curved waveforms of the curved plates 26a, 26b so as to make axial rotation in the reverse direction of the input shaft's 25 rotation.

The inner pins 31, which are inserted in the through holes 30a and are sufficiently smaller in diameter than the through holes 30a, abut against the walls of the through holes 30a with the axial rotation of the curved plates 26a, 26b. Thus, the orbital motion of the curved plates 26a, 26b is not transmitted to the inner pins 31, but only the axial rotation of the curved plates 26a, 26b is transmitted to the wheel-hub bearing unit C via the output shaft 28. As described above, the through holes 30a and inner pins 31 play a role of a motion conversion mechanism.

Through the motion conversion mechanism, the output shaft 28, which is coaxially aligned with the input shaft 25, extracts the axial rotation of the curved plates 26a, 26b as an output of the speed reduction unit B. Consequently, the rotational speed of the input shaft 25 is reduced by the speed reduction unit B and transmitted to the output shaft 28. Even if the adopted motor unit A produces a low torque at a high rotational speed, adequate torque required for the driving wheels can be transmitted.

A reduction ratio of the above-described speed reduction unit B is calculated by $(Z_A-Z_B)/Z_B$, wherein $Z_A$ represents the number of the outer pins 27 and $Z_B$ represents the number of the waveforms of the curved plates 26a, 26b. In the example shown in FIG. 2 where $Z_A=12$ and $Z_B=11$, the reduction ratio results in 1/11, which is a considerably high reduction ratio.

Adoption of such a cycloid speed reduction mechanism, capable of obtaining a high reduction ratio without multi-stage configuration, as the speed reduction unit B can provide a compact in-wheel motor drive assembly 21 with a high reduction ratio.

Figure 12:
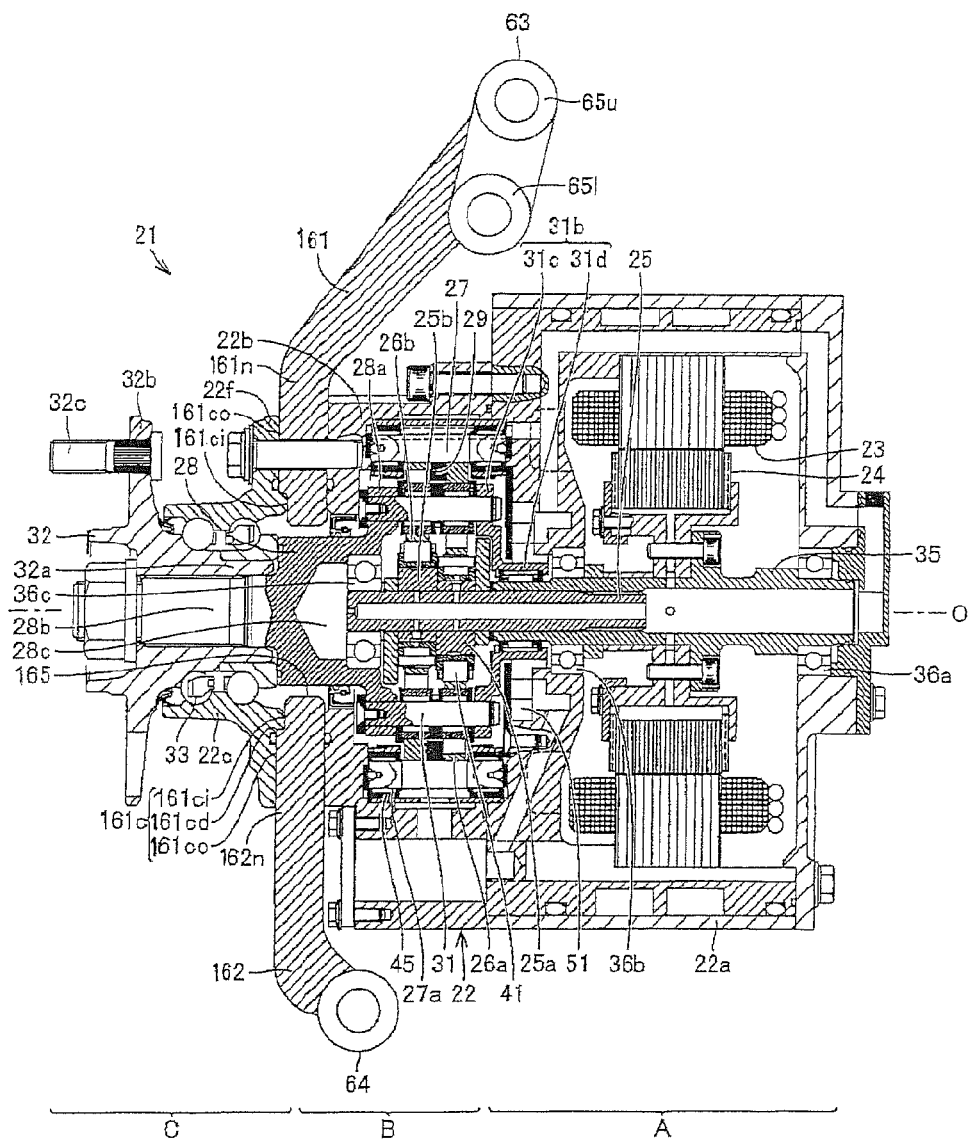
FIG. 12 is a vertical cross-sectional view of an in-wheel motor drive assembly according to a modification of the present invention.

Next, a modification of the present invention will be described. FIG. 12 is a vertical cross-sectional view of a modification of the present invention. Through the modification, components common with those in the previous examples are marked with the same numerals as the examples and will not be further explained, but different components will be described below. In this modification, a root end part 161n is interposed between the wheel-hub-bearing outer ring 22c and speed-reduction-unit casing 22b to separate the wheel-hub-bearing outer ring 22c from the speed-reduction-unit casing 22b. The upper coupling member 161 and lower coupling member 162 are integrally connected with each other at the root end part 161n. In short, the root end parts 161n, 162n form a single common annular portion.

Since the wheel-hub-bearing outer ring 22c and the speed-reduction-unit casing 22b in the modification shown in FIG. 12 are separated from each other, there is no need to provide the casing projecting portion 22d as shown in the example in FIG. 10, thereby shortening the axial dimension of the wheel-hub-bearing outer ring 22c. In addition, the wheel load is transmitted to the wheel-hub-bearing outer ring 22c and the coupling members 161, 162, but not to the speed-reduction-unit casing 22b at all. Therefore, the wheel load is not input to the motor unit A and speed reduction unit B, which suitably prevents the deformation of the motor unit A and speed reduction unit B.

Also the modification in FIG. 12 can have an axially-longer center bore 28c extending in the output shaft 28 from the flange portion 28a toward the shaft portion 28b in comparison with the example in FIG. 10. More specifically, the bottom of the center bore 28c is positioned deep to the extent that at least the root end parts 161n, 162n are axially aligned with. According to the modification, the output shaft 28 can have at least a hollow part in the direction of the axis O and therefore can be reduced in weight, which compensates for the weight increase caused by addition of the arm-like coupling members 161, 162 to the in-wheel motor drive assembly 21.

Furthermore, the modification in FIG. 12 provides rabbet joints in contact faces of the coupling members 161, 162 and wheel-hub-bearing outer ring 22c. The root end part 161n is interposed between the wheel-hub-bearing outer ring 22c and speed-reduction-unit casing 22b, and an end face of the wheel-hub-bearing outer ring 22c axially adjacent to the speed reduction unit B is in surface contact with an end face 161c of the coupling members 161, 162.

The faces making contact therewith are orthogonal to the axis O. The end face 161c includes a radially outer flat face 161co, a radially inner flat face 161ci and a step 161cd therebetween. In other words, the end face 161c in surface contact includes the flat faces 161co and 161ci to form two stairs. The wheel-hub-bearing outer ring 22c also has on its end face a step and two flat faces mating with the stepped flat face.

In the modification in FIG. 12, the rabbet joint provided at the contact surface of the wheel-hub-bearing outer ring 22c and the annular root end part 161n reinforces the connection of the wheel-hub-bearing outer ring 22c and coupling members 161, 162. In addition, the rabbet joint facilitates positioning of the coupling members 161, 162 in manufacturing operations of the in-wheel motor drive assembly 21, thereby increasing assembling efficiency.

Figure 13:
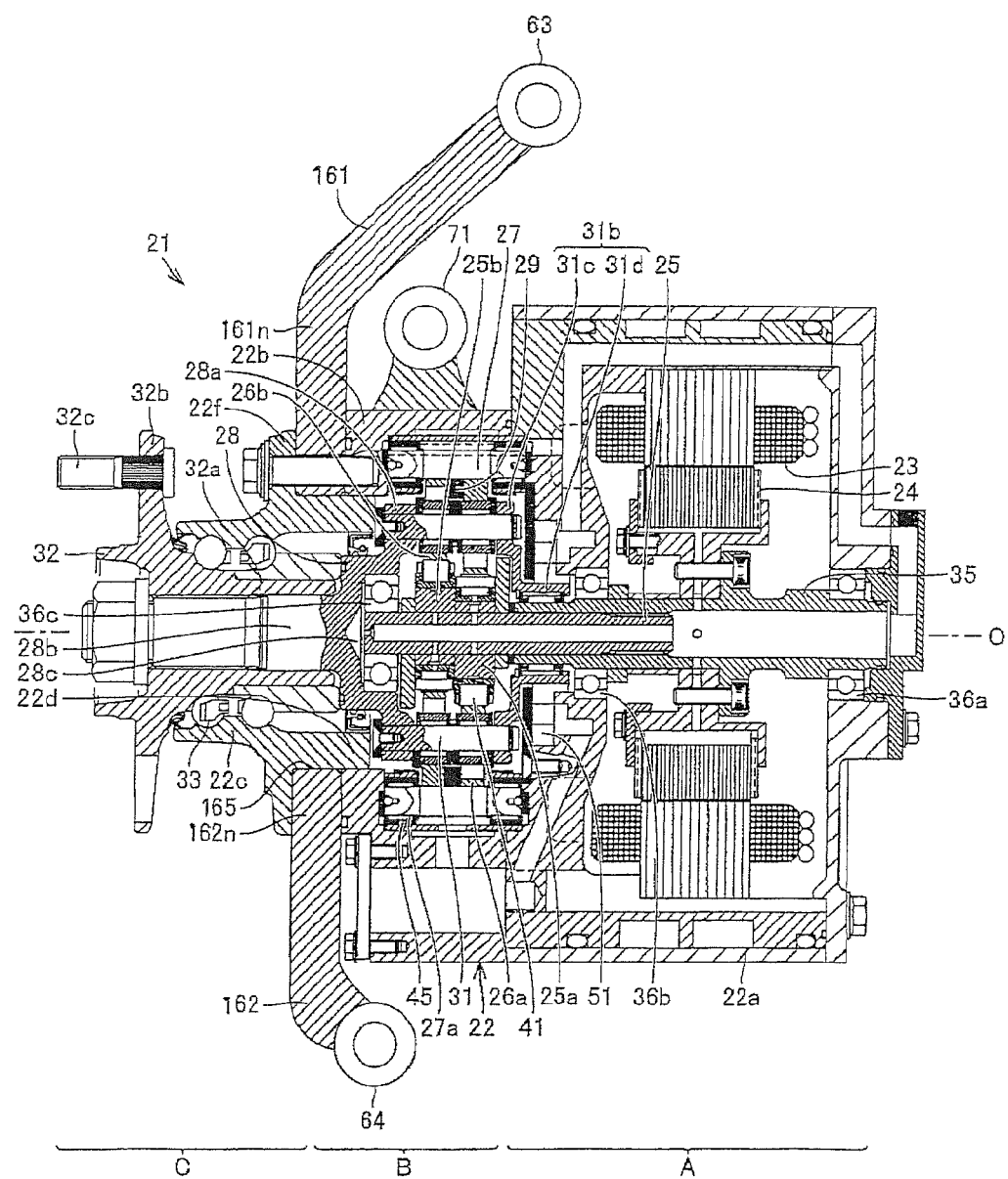
FIG. 13 is a vertical cross-sectional view of an in-wheel motor drive assembly according to the seventh example of the present invention.

Next, another example of the present invention will be described. FIG. 13 is a vertical cross-sectional view of the seventh example of the present invention. Through the seventh example, components common with those in the previous examples are marked with the same numerals as the examples and will not be further explained, but different components will be described below. In the seventh example, the upper coupling member 161 has a single coupling portion 63 at its top end. The speed-reduction-unit casing 22b has a coupling portion 71 on the outer circumferential surface thereof to fixedly couple with a member of the vehicle body. The coupling portion 71 is located above the axis O and in a middle part of the casing 22b along the axis O.

In the example shown in FIG. 13, the upper coupling member 161, lower coupling member 162 and coupling portion 71 are attached to a well-known double wishbone type suspension system having an upper arm, lower arm and shock absorber. Specifically, the coupling portion 63 of the upper coupling member 161 is coupled to a free end of the upper arm (not shown) extending in the width direction of the vehicle. A ball joint can be used to couple them. An example of the upper arm is vertically swingable and has a base end coupled with the vehicle body.

A coupling portion 64 of the lower coupling member 162 is coupled with a free end of the lower arm (not shown) extending in the width direction of the vehicle. A ball joint can be used to couple them. An example of the lower arm is vertically swingable and has a base end coupled with the vehicle body.

The coupling portion 71 is coupled with a lower end of the shock absorber (not shown) extending in the vertical direction. A ball joint can be used to couple them. An example of the shock absorber has an upper end coupled with the vehicle body.

According to the example shown in FIG. 13, the in-wheel motor drive assembly 21 includes the upper coupling member 161, lower coupling member 162 and coupling portion 71 as coupling members coupled to members of the vehicle body. These coupling members allow the in-wheel motor drive assembly 21 to be suspended from the vehicle body together with a wheel fixedly coupled with the wheel hub 32.

A wheel load to be imposed on the wheel supporting the vehicle body is transmitted from the vehicle body, via the upper coupling member 161, lower coupling member 162 and coupling portion 71, to the speed-reduction-unit casing 22b, wheel-hub-bearing outer ring 22c, wheel hub bearing 33 and wheel hub 32 in this order of succession, and supported by the wheel. Accordingly, the wheel load does not reach the motor unit A. The external force generated by sudden acceleration and deceleration and road roughness also does not reach the motor unit A. Therefore, deformation of the motor unit A can be properly prevented. In addition, it is possible to provide a light-weight in-wheel motor drive assembly 21 by forming the motor-unit casing 22a with a thin material. Consequently, the unsprung weight of the suspension system can be reduced, thereby improving the riding comfort of the vehicle.

According to the example shown in FIG. 13, the in-wheel motor drive assembly 21 includes not only the upper coupling member 161 located above the axis O and the lower coupling member 162 located below the axis O, but also the coupling portion 71 on the outer circumferential surface of the speed-reduction-unit casing 22b to couple with a member of the vehicle body. These coupling members and portion allow the in-wheel motor drive assembly 21 to be properly mounted to a double wishbone type suspension system.

Figure 14:
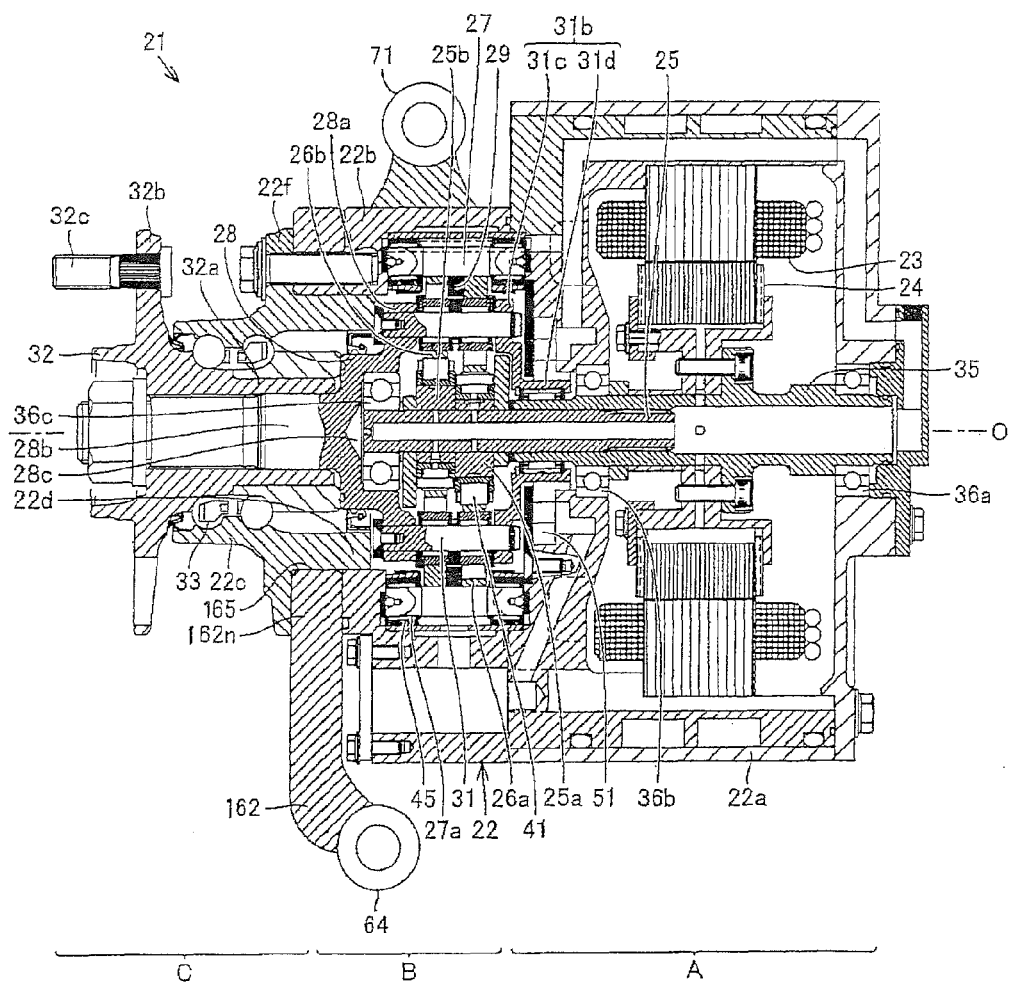
FIG. 14 is a vertical cross-sectional view of an in-wheel motor drive assembly according to the eighth example of the present invention.

Next, yet another example of the present invention will be described. FIG. 14 is a vertical cross-sectional view of the eighth example of the present invention. Through the eighth example, components common with those in the previous examples are marked with the same numerals as the examples and will not be further explained, but different components will be described below. In the eighth example, the in-wheel motor drive assembly 21 includes the lower coupling member 162 as a coupling member, but not the upper coupling member 161. The speed-reduction-unit casing 22b has the coupling portion 71 on the outer circumferential surface thereof to fixedly couple with a member of the vehicle body. The coupling portion 71 is provided above the axis O and in a middle part of the casing 22b along the axis O.

In the example shown in FIG. 14, the lower coupling member 162 and coupling portion 71 are attached to a well-known trailing arm type suspension system having a trailing arm and shock absorber. Specifically, a coupling portion 64 of the lower coupling member 162 is coupled with a free end of the trailing arm (not shown) extending in the longitudinal direction of the vehicle. A ball joint can be used to couple them. An example of the trailing arm is vertically swingable and has a base end coupled with the vehicle body.

The coupling portion 71 is coupled with a lower end of the shock absorber (not shown) extending in the vertical direction. A ball joint can be used to couple them. An example of the shock absorber has an upper end coupled with the vehicle body.

According to the example in FIG. 14, the in-wheel motor drive assembly 21 has the lower coupling member 162 and coupling portion 71 coupled with members of the vehicle body. The coupling member and portion allow the in-wheel motor drive assembly 21 to be suspended from the vehicle body together with a wheel fixedly coupled with the wheel hub 32.

A wheel load to be imposed on the wheel supporting the vehicle body is transmitted from the vehicle body, via the lower coupling member 162 and coupling portion 71, to the speed-reduction-unit casing 22b, wheel-hub-bearing outer ring 22c, wheel hub bearing 33 and wheel hub 32 in this order of succession, and supported by the wheel. Accordingly, the wheel load does not reach the motor unit A. The external force generated by sudden acceleration and deceleration and road roughness also does not reach the motor unit A. Therefore, deformation of the motor unit A can be properly prevented. In addition, it is possible to provide a light-weight in-wheel motor drive assembly 21 by forming the motor-unit casing 22a with a thin material. Consequently, the unsprung weight of the suspension system can be reduced, thereby improving the riding comfort of the vehicle.

According to the example shown in FIG. 14, the in-wheel motor drive assembly 21 has not only the lower coupling member 162 located below the axis O, but also the coupling portion 71 located on the outer circumferential surface of the speed-reduction-unit casing 22b to couple with a member of the vehicle body, thereby properly mounting the in-wheel motor drive assembly 21 to the trailing arm type suspension system.

In another modification (not shown), the root end parts of the aforementioned coupling members 161, 162 can be fixedly interposed between the motor-unit casing 22a and speed-reduction-unit casing 22b. Even this modification can prevent the wheel load from being transmitted to the motor unit A, and therefore deformation of the motor unit A can be suitably prevented.

In yet another modification (not shown), the coupling members 161, 162 can have seat portions, respectively, in their middle regions between the root end parts and projecting ends to hold a brake caliper in a secure manner. The brake caliper is to damp the rotation of a brake disc (not shown) fixedly coupled with the wheel hub 32. The seat portions allow the brake calipers to be fixedly coupled with the coupling members 161, 162, thereby facilitating the arrangement of the brake calipers.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

INDUSTRIAL APPLICABILITY

The in-wheel motor drive assembly according to the present invention is advantageously used in electric vehicles and hybrid vehicles.

REFERENCE SIGNS LIST

21: in-wheel motor drive assembly; 22: casing; 22a: motor-unit casing; 22b: speed-reduction-unit casing; 22c: wheel-hub-bearing outer ring; 22e: flange portion; 23: stator; 24: rotor; 25: input shaft; 25a, 25b: eccentric member; 26a, 26b: curved plate; 27: outer pin; 28: output shaft; 28c: center bore; 31: inner pin; 32: wheel hub; 33: wheel hub bearing; 35: motor rotary shaft; 61, 62, 63, 64: coupling portion; 65, 66: motor-side coupling portion; 63, 64: coupling portion; 65:

through bore; 71: coupling portion; 161: upper coupling member; 162: lower coupling member; 161*n*, 162*n*: root end part.

The invention claimed is:

1. An in-wheel motor drive assembly comprising:
   a motor unit including a motor rotary shaft;
   a speed reduction unit including an output shaft reducing the rotational speed of the motor rotary shaft and outputting the reduced rotation, the speed reduction unit being disposed on one axial side of the motor unit;
   a wheel hub bearing unit including a wheel hub transmitting the reduced rotation output from the speed reduction unit to the wheel and being disposed on one axial side of the speed reduction unit and a wheel-hub-bearing rotatably supporting the wheel hub,
   wherein a casing portion disposed between the motor unit and the speed reduction unit of the in-wheel motor drive assembly has a bearing rotatably supporting the motor rotary shaft and a coupling portion for coupling the in-wheel motor drive assembly with a member of a vehicle body on a radially outside of the bearing, and
   further wherein the casing portion includes a motor unit casing forming a contour of the motor unit and a speed reduction unit casing forming a contour of the speed reduction unit to couple with an outer ring of the wheel-hub-bearing on one axial side, wherein the coupling portion includes a flange portion disposed between the motor unit casing and the speed reduction unit casing.

2. The in-wheel motor drive assembly according to claim 1, wherein the casing portion is a radially extending flange portion centered on the bearing.

3. The in-wheel motor drive assembly according to claim 1, wherein the coupling portion includes a front coupling portion disposed frontward with respect to an axis of the in-wheel motor and projecting downwardly and a rear coupling portion disposed rearward with respect to the axis and projecting downwardly.

4. The in-wheel motor drive assembly according to claim 1, wherein the coupling portion includes an upper coupling portion disposed above an axis of the in-wheel motor and a lower coupling portion disposed below the axis.

5. The in-wheel motor drive assembly according to claim 4, wherein the motor unit further includes a motor-side coupling portion to be coupled with a suspension system of the vehicle body at an end portion of the motor that is positioned axially opposite to the speed reduction unit.

6. The in-wheel motor drive assembly according to claim 1, wherein the coupling portion is disposed below an axis of the in-wheel motor, and the motor unit further includes a motor-side coupling portion for coupling with a member of the vehicle body at an upper area of an end of the motor that is positioned axially opposite to the speed reduction unit.

7. The in-wheel motor drive assembly according to claim 1, wherein the coupling portion is disposed above the axis, and the motor unit further includes a motor-side coupling portion for coupling with a member of the vehicle body at a lower area of an end of the motor unit that is positioned axially opposite to the speed reduction unit.

8. The in-wheel motor drive assembly according to claim 1, wherein the casing portion includes a caliper coupling portion used to attach a brake caliper.

9. The in-wheel motor drive assembly according to claim 1, wherein the speed reduction unit adopts a cycloid speed reduction mechanism including an input shaft fixedly coupled to the motor rotary shaft, a disc-like eccentric member connected to an end of the input shaft so as to be eccentric from a rotational axis of the input shaft, a revolution member whose inner circumferential surface is attached to the outer circumferential surface of the eccentric member so as to rotate relative to the eccentric member, the revolution member making orbital motion around the rotational axis with rotation of the input shaft, a perimeter engagement member engaging with an outer perimeter of the revolution member to allow the revolution member to make axial rotation, and a motion conversion mechanism extracting only the axial rotation of the revolution member to transmit the axial rotation to the output shaft.

10. The in-wheel motor drive assembly according to claim 9, wherein the motion conversion mechanism includes a plurality of holes equidistantly formed in the revolution member in a circumferential direction centered on the rotational axis, a plurality of inner engagement members equidistantly provided on an end of the output shaft in a circumferential direction centered on the axis of the output shaft and fitting in the holes, respectively.

\* \* \* \* \*